US011538237B2

(12) United States Patent
Rajagopal et al.

(10) Patent No.: US 11,538,237 B2
(45) Date of Patent: Dec. 27, 2022

(54) UTILIZING ARTIFICIAL INTELLIGENCE TO GENERATE AND UPDATE A ROOT CAUSE ANALYSIS CLASSIFICATION MODEL

(71) Applicant: Accenture Global Solutions Limited, Dublin (IE)

(72) Inventors: Vidya Rajagopal, Bangalore (IN); Gaurav Mengi, Bangalore (IN); Marin Grace Mercylawrence, Bangalore (IN); Bijayani Das, Purushottampur (IN)

(73) Assignee: Accenture Global Solutions Limited, Dublin (IE)

( * ) Notice: Subject to any disclaimer, the term of this patent is extended or adjusted under 35 U.S.C. 154(b) by 1018 days.

(21) Appl. No.: 16/248,118

(22) Filed: Jan. 15, 2019

(65) Prior Publication Data
US 2020/0226401 A1   Jul. 16, 2020

(51) Int. Cl.
| | |
|---|---|
| *G06F 11/00* | (2006.01) |
| *G06V 10/98* | (2022.01) |
| *G06K 9/62* | (2022.01) |
| *G06N 3/04* | (2006.01) |
| *G06F 11/07* | (2006.01) |
| *G06F 11/22* | (2006.01) |

(52) U.S. Cl.
CPC ............ *G06V 10/98* (2022.01); *G06F 11/079* (2013.01); *G06F 11/2263* (2013.01); *G06K 9/628* (2013.01); *G06K 9/6256* (2013.01); *G06N 3/04* (2013.01)

(58) Field of Classification Search
CPC ........................... G06F 11/079; G06F 11/2263
USPC ........................................................ 714/1–57
See application file for complete search history.

(56) References Cited

U.S. PATENT DOCUMENTS

| | | | | |
|---|---|---|---|---|
| 6,954,678 | B1* | 10/2005 | Phan ...................... | H01L 22/26 700/121 |
| 2004/0225475 | A1* | 11/2004 | Johnson ............. | G05B 23/0278 702/185 |
| 2006/0015263 | A1* | 1/2006 | Stupp ...................... | G06F 17/18 702/19 |
| 2006/0053357 | A1* | 3/2006 | Rajski .............. | G01R 31/31835 714/742 |
| 2009/0327195 | A1* | 12/2009 | Iscen ...................... | G06N 5/042 706/50 |

(Continued)

*Primary Examiner* — Sarai E Butler
(74) *Attorney, Agent, or Firm* — Harrity & Harrity, LLP

(57) ABSTRACT

A device trains a classification model with defect classifier training data to generate a trained classification model and processes information indicating priorities and rework efforts for defects, with a Pareto analysis model, to select a set of classes for the defects. The device calculates defect scores for the set of the classes and selects a particular class, from the set of the classes, based on the defect scores. The device processes a historical data set for the particular class to identify a root cause corrective action (RCCA) recommendation and processes information indicating a defect associated with the particular class, with the trained classification model, to generate a predicted RCCA recommendation for the defect. The device processes the predicted RCCA recommendation and the RCCA recommendation, with a linear regression model, to determine an effectiveness score for the predicted RCCA recommendation and retrains the classification model based on the effectiveness score.

20 Claims, 17 Drawing Sheets

(56) References Cited

U.S. PATENT DOCUMENTS

| | | | | |
|---|---|---|---|---|
| 2012/0173927 A1* | 7/2012 | Rymeski | ............. | G06F 11/0709 |
| | | | | 714/E11.029 |
| 2014/0181097 A1* | 6/2014 | Basu | .................... | G06F 16/285 |
| | | | | 707/758 |
| 2015/0067394 A1* | 3/2015 | Naseh | ................. | G06F 11/0709 |
| | | | | 714/15 |
| 2016/0100322 A1* | 4/2016 | Ekambaram | ........ | G06F 11/3466 |
| | | | | 455/418 |
| 2016/0241429 A1* | 8/2016 | Froehlich | ............ | H04L 41/0631 |
| 2017/0061330 A1* | 3/2017 | Kurata | ................. | G06F 16/3344 |
| 2018/0268291 A1* | 9/2018 | Turner | ................... | G06N 3/088 |
| 2019/0096053 A1* | 3/2019 | Asbag | ................... | G06T 7/0004 |
| 2019/0347148 A1* | 11/2019 | Gomes Pereira | ...... | G06K 9/623 |

* cited by examiner

UTILIZING ARTIFICIAL INTELLIGENCE TO GENERATE AND UPDATE A ROOT CAUSE ANALYSIS CLASSIFICATION MODEL

BACKGROUND

Root cause analysis is a method of problem solving used for identifying root causes of defects, faults, problems, and/or the like. A factor is considered a root cause if removal thereof from a defect sequence prevents a final undesirable outcome from recurring. A causal factor is a factor that affects an event outcome but is not a root cause. Thus, removing a causal factor can benefit an event outcome but does not prevent recurrence of the outcome with certainty.

SUMMARY

According to some implementations, a method may include training a classification model with defect classifier training data to generate a trained classification model for performing a root cause analysis, and utilizing the trained classification model to determine information indicating classes, priorities, and rework efforts for defects indicated in the defect classifier training data. The method may include processing the information indicating the priorities and the rework efforts for the defects, with a Pareto analysis model, to select a set of the classes for the defects, and calculating defect scores for the set of the classes for the defects, wherein the defect scores may be calculated based on a quantity of the defects in the set of the classes and the priorities associated with the defects in the set of the classes. The method may include selecting a particular class, from the set of the classes for the defects, based on the defect scores, and processing a historical data set associated with a portion of the particular class to identify a root cause corrective action recommendation, wherein implementation of the root cause corrective action recommendation may remove a defect associated with the particular class. The method may include processing information indicating the defect associated with the particular class, with the trained classification model, to generate a predicted root cause corrective action recommendation for the defect associated with the particular class, wherein implementation of the predicted root cause corrective action recommendation may remove some or all of the defect associated with the particular class. The method may include determining an effectiveness score for the predicted root cause corrective action recommendation based on the root cause corrective action recommendation, wherein the effectiveness score may provide a measure of an effectiveness of the predicted root cause corrective action recommendation in removing the defect associated with the particular class, as compared to the root cause corrective action recommendation. The method may include retraining the trained classification model, based on the measure of the effectiveness of the predicted root cause corrective action recommendation in removing the defect associated with the particular class, to generate a retrained classification model and performing one or more actions based on the retrained classification model.

According to some implementations, a device may include one or more memories and one or more processors, communicatively coupled to the one or more memories, to train a classification model with defect classifier training data to generate a trained classification model for performing a root cause analysis and process the defect classifier training data, with the trained classification model, to identify information indicating classes for defects indicated in the defect classifier training data. The one or more processors may process the defect classifier training data, with a count vector, a cosine scorer, and a linear regression model, to identify information indicating priorities for the defects, and may process the defect classifier training data, with the count vector and the linear regression model, to identify information indicating rework efforts for the defects. The one or more processors may process the information indicating the priorities and the rework efforts for the defects, with a Pareto analysis model, to select a set of the classes for the defects, and may calculate defect scores for the set of the classes for the defects, wherein the defect scores may be calculated based on a quantity of the defects in the set of the classes and the priorities associated with the defects in the set of the classes. The one or more processors may select a particular class, from the set of classes for the defects, based on the defect scores, and may process a historical data set associated with a portion of the particular class to identify a root cause corrective action recommendation, wherein implementation of the root cause corrective action recommendation may remove a defect associated with the particular class. The one or more processors may process information indicating the defect associated with the particular class, with the trained classification model, to generate a predicted root cause corrective action recommendation for the defect associated with the particular class, wherein implementation of the predicted root cause corrective action recommendation may remove some or all of the defect associated with the particular class. The one or more processors may determine an effectiveness score for the predicted root cause corrective action recommendation based on the root cause corrective action recommendation, wherein the effectiveness score may provide a measure of an effectiveness of the predicted root cause corrective action recommendation in removing the defect associated with the particular class, as compared to the root cause corrective action recommendation. The one or more processors may retrain the trained classification model, based on the measure of the effectiveness of the predicted root cause corrective action recommendation in removing the defect associated with the particular class, to generate a retrained classification model, and may perform one or more actions based on the retrained classification model.

According to some implementations, a non-transitory computer-readable medium may store instructions that include one or more instructions that, when executed by one or more processors of a device, cause the one or more processors to train a classification model with defect classifier training data to generate a trained classification model for performing a root cause analysis, wherein the defect classifier training data includes information indicating one or more of descriptions of defects, classes for the defects, priorities for the defects, or rework efforts for the defects. The one or more instructions may cause the one or more processors to process the information indicating the priorities and the rework efforts for the defects, with a Pareto analysis model, to select a set of the classes for the defects and calculate defect scores for the set of the classes for the defects, wherein the defect scores may be calculated based on a quantity of the defects in the set of the classes and the priorities associated with the defects in the set of the classes. The one or more instructions may cause the one or more processors to select a particular class, from the set of the classes for the defects, based on the defect scores, and process a historical data set associated with a portion of the particular class to identify a root cause corrective action recommendation, wherein implementation of the root cause corrective action recommendation may remove a defect associated with the particular class. The one or more instructions may cause the one or more processors to process information indicating the defect associated with the particular class, with the trained classification model, to generate a predicted root cause corrective action recommendation for the defect associated with the particular class, wherein implementation of the predicted root cause corrective action recommendation may remove some or all of the defect associated with the particular class. The one or more instructions may cause the one or more processors to process the predicted root cause corrective action recommendation and the root cause corrective action recommendation, with a linear regression model, to determine an effectiveness score for the predicted root cause corrective action recommendation, wherein the effectiveness score may provide a measure of an effectiveness of the predicted root cause corrective action recommendation in removing the defect associated with the particular class, as compared to the root cause corrective action recommendation. The one or more instructions may cause the one or more processors to retrain the trained classification model, based on the measure of the effectiveness of the predicted root cause corrective action recommendation in removing the defect associated with the particular class, to generate a retrained classification model and perform one or more actions based on the retrained classification model.

DETAILED DESCRIPTION

Figure 1A:
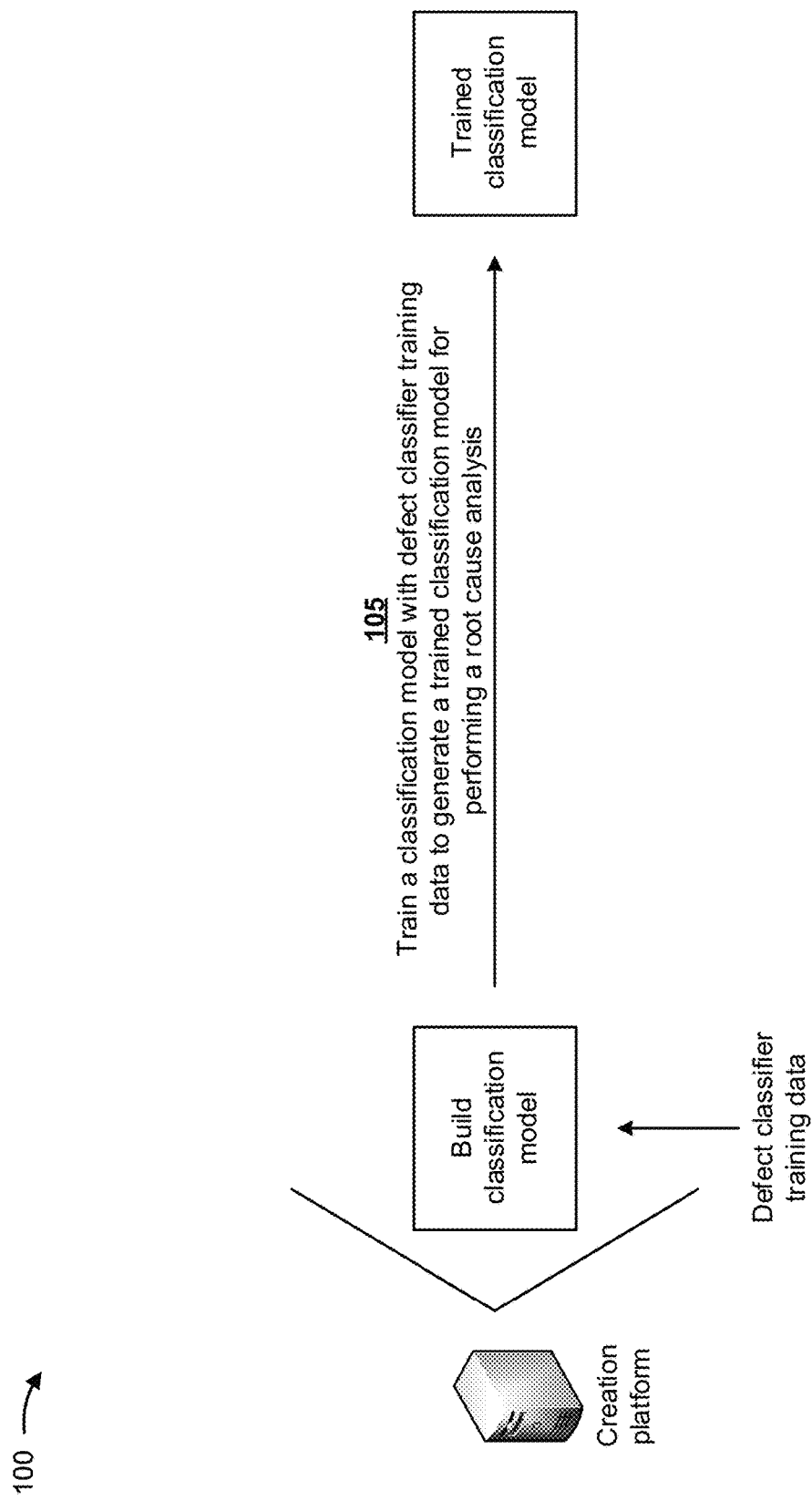
FIGS. 1A-1L are diagrams of an example implementation described herein.

The following detailed description of example implementations refers to the accompanying drawings. The same reference numbers in different drawings may identify the same or similar elements.

A root cause analysis model is created by properly defining and describing a defect; establishing a timeline from a normal situation until a final crisis or failure; distinguishing between root causes and causal factors; and implementing with constant execution.

Some implementations described herein provide a creation platform that utilizes artificial intelligence to generate and update a root cause analysis classification model. For example, the creation platform may train a classification model (e.g., a classifier model that performs defect classification into class and subclasses, and a cosine vector similarity scorer and a linear regression model that determine priorities and rework efforts for defects) with defect classifier training data to generate a trained classification model for performing a root cause analysis, wherein the defect classifier training data includes information indicating one or more of descriptions of defects, classes for the defects, priorities for the defects, or rework efforts for the defects. The creation platform may process the information indicating the priorities and the rework efforts for the defects, with a Pareto analysis model, to select a set of the classes for the defects and may calculate defect scores for the set of the classes for the defects, wherein the defect scores may be calculated based on a quantity of the defects in the set of the classes and the priorities associated with the defects in the set of the classes. The creation platform may select a particular class, from the set of the classes for the defects, based on the defect scores and may process a historical data set associated with a portion of the particular class to identify a root cause corrective action recommendation, wherein implementation of the root cause corrective action recommendation may remove a defect associated with the particular class. The creation platform may process information indicating the defect associated with the particular class, with the trained classification model, to generate a predicted root cause corrective action recommendation for the defect associated with the particular class, wherein implementation of the predicted root cause corrective action recommendation may remove some or all of the defect associated with the particular class. The creation platform may process the predicted root cause corrective action recommendation and the root cause corrective action recommendation, with a linear regression model, to determine an effectiveness score for the predicted root cause corrective action recommendation, wherein the effectiveness score may provide a measure of an effectiveness of the predicted root cause corrective action recommendation in removing the defect associated with the particular class, as compared to the root cause corrective action recommendation. The creation platform may retrain the trained classification model, based on the measure of the effectiveness of the predicted root cause corrective action recommendation in removing the defect associated with the particular class, to generate a retrained classification model, and may perform one or more actions based on the retrained classification model.

In this way, the creation platform automates the root cause analysis determination process and improves root cause analysis recommendations, which conserves resources (e.g., processing resources, memory resources, and/or the like) that would otherwise be wasted utilizing inferior root cause analysis recommendations. The creation platform conserves resources and prevents error generation associated with identifying defect classification, priorities, rework estimates, and/or the like. The creation platform improves software development by identifying root cause for failures early in the software development cycle, reduces software rework effort by identifying a defect class that requires immediate attention, and provides recommendations that avoid similar defects in future software development cycles.

FIGS. 1A-1L are diagrams of an example implementation 100 described herein. As shown in FIG. 1A, a creation platform may receive defect classifier training data. In some implementations, the defect classifier training data may include training data that includes descriptions of defects (e.g., software application defects), a first class (e.g., application error codes) associated with the defects, a second class (e.g., a user class, such as a business requirement) associated with the defects, a third class (e.g., browser specific, accessibility relates, visual, logic, and/or the like) associated with the defects, priorities associated with the defects (e.g., major defect, minor defect, etc.), rework efforts (e.g., measured in time periods) associated with the defects, and/or the like. In some implementations, the defect classifier training data may include historical defect classifier training data associated with historical software development of software applications, project-specific defect training data associated with specific software development project, and/or the like. In some implementations, the creation platform may prioritize the defect classifier training data based on the priorities associated with the defects.

As further shown in FIG. 1A, and by reference number 105, the creation platform may train a classification model (e.g., a classifier model that performs defect classification into class and subclasses, and a cosine vector similarity scorer and a linear regression model that determine priorities and rework efforts for defects), with the defect classifier training data, to generate a trained classification model for performing a root cause analysis. In some implementations, the classification model may include a deep neural network (DNN) multi-label classification model, a logistic regression model, a decision tree model, a random forest model, a naïve Bayesian model, and/or one or more combinations of the aforementioned or other suitable models.

In some implementations, the creation platform may perform a training operation on the classification model with the defect classifier training data. For example, the creation platform may separate the defect classifier training data into a training set, a validation set, a test set, and/or the like. The training set may be utilized to the train the classification model. The validation set may be utilized to validate results of the trained classification model. The test set may be utilized to test operation of the classification model. In some implementations, the creation platform may train the classification model using, for example, a supervised training procedure and based on the training set of the defect classifier training data. For example, the creation platform may perform dimensionality reduction to reduce the defect classifier training data to a minimum feature set, thereby reducing resources (e.g., processing resources, memory resources, and/or the like) to train the classification model, and may apply a classification technique, to the minimum feature set.

In some implementations, the creation platform may use a logistic regression classification technique to determine a categorical outcome (e.g., information indicating classes, priorities, and/or rework efforts for defects). Additionally, or alternatively, the creation platform may use a naïve Bayesian classifier technique. In this case, the creation platform may perform binary recursive partitioning to split the defect classifier training data into partitions and/or branches and use the partitions and/or branches to perform predictions (e.g., information indicating classes, priorities, and/or rework efforts for defects). Based on using recursive partitioning, the creation platform may reduce utilization of computing resources relative to manual, linear sorting and analysis of data points, thereby enabling use of thousands, millions, or billions of data points to train the classification model, which may result in a more accurate model than using fewer data points.

Additionally, or alternatively, the creation platform may use a support vector machine (SVM) classifier technique to generate a non-linear boundary between data points in the training set. In this case, the non-linear boundary is used to classify test data into a particular class.

Additionally, or alternatively, the creation platform may train the classification model using a supervised training procedure that includes receiving input to the classification model from a subject matter expert, which may reduce an amount of time, an amount of processing resources, and/or the like to train the classification model of activity automatability, relative to an unsupervised training procedure. In some implementations, the creation platform may use one or more other model training techniques, such as a neural network technique, a latent semantic indexing technique, and/or the like. For example, the creation platform may perform an artificial neural network processing technique (e.g., using a two-layer feedforward neural network architecture, a three-layer feedforward neural network architecture, and/or the like) to perform pattern recognition with regard to particular insights indicated in the defect classifier training data. In this case, using the artificial neural network processing technique may improve an accuracy of the trained classification model generated by the creation platform by being more robust to noisy, imprecise, or incomplete data, and by enabling the creation platform to detect patterns and/or trends undetectable to human analysts or systems using less complex techniques.

In some implementations, the creation platform may receive the trained classification model from another source and may retrain the classification model as described below.

Figure 1B:
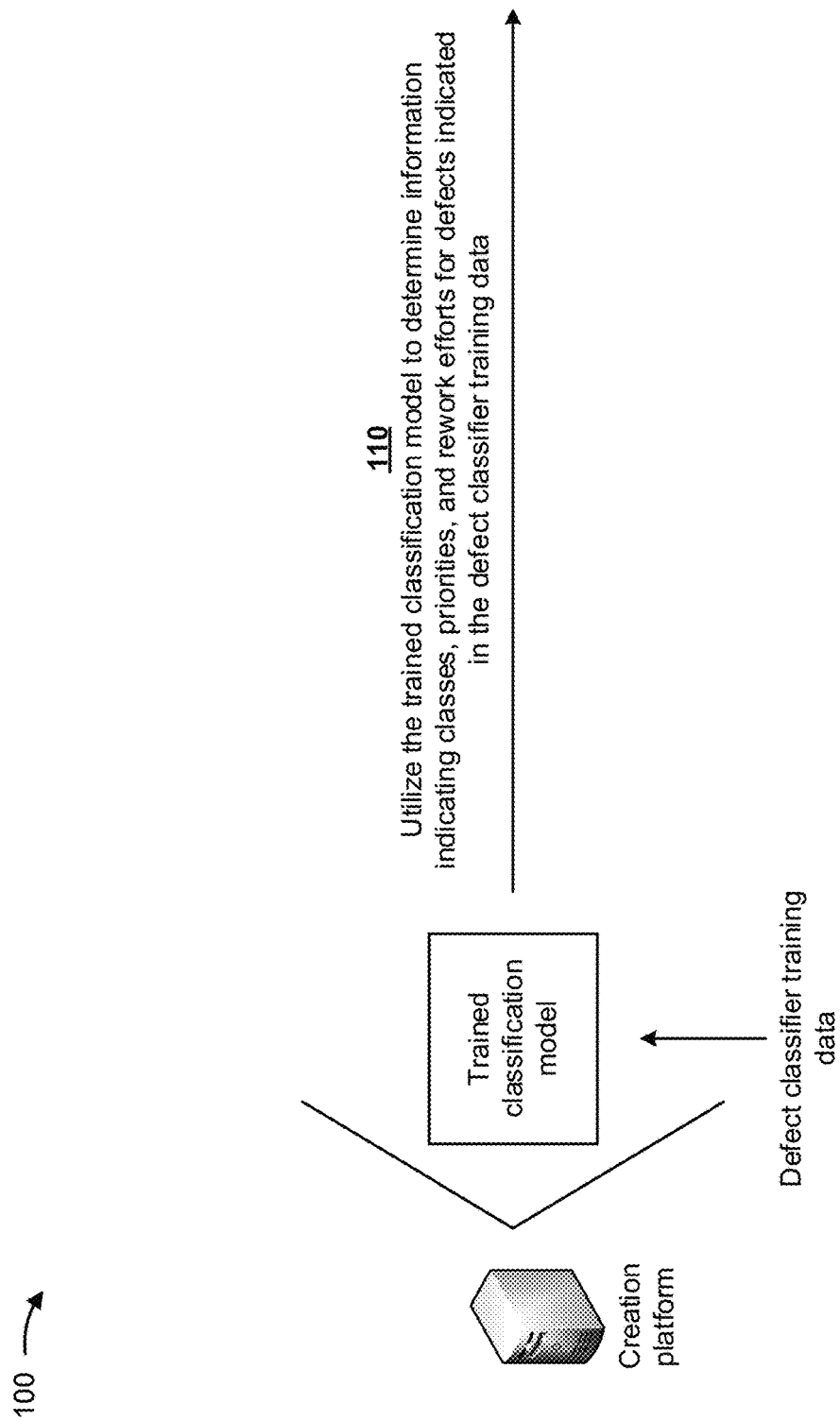

As shown in FIG. 1B, and by reference number 110, the creation platform may utilize the trained classification model to determine information indicating classes, priorities, and rework efforts for defects indicated in the defect classifier training data. In some implementations, the creation platform may process the defect classifier training data, with the trained classification model, to determine information indicating the classes (e.g., a first class, a second class, a third class, and/or the like) for the defects in the defect classifier training data.

In some implementations, the creation platform may process the defect classifier training data, with a count vector, a cosine scorer, and a linear regression model, to determine information indicating the priorities for the defects in the defect classifier training data. The count vector may include a vector that includes, for each defect identified in the defect classifier training data, an integer count for a quantity of times the defect appears in the defect classifier training data. The cosine scorer may determine a cosine similarity between vectors representing defects from the defect classifier training data. The cosine similarity may be based on angles associated with vectors and may provide an indication of how similar one defect is to another defect. The linear regression model may include a model that includes a continuous dependent variable, continuous or discrete independent variables, and a linear regression line. The linear regression model may establish a relationship between the dependent variable and one or more independent variables using a best fit straight line (e.g., the regression line).

In some implementations, the creation platform may process the defect classifier training data, with the count vector and the linear regression model, to determine information indicating the rework efforts for the defects in the defect classifier training data. In some implementations, the information indicating the rework efforts for the defects may include information indicating quantities of time required to eliminate the defects.

Figure 1C:
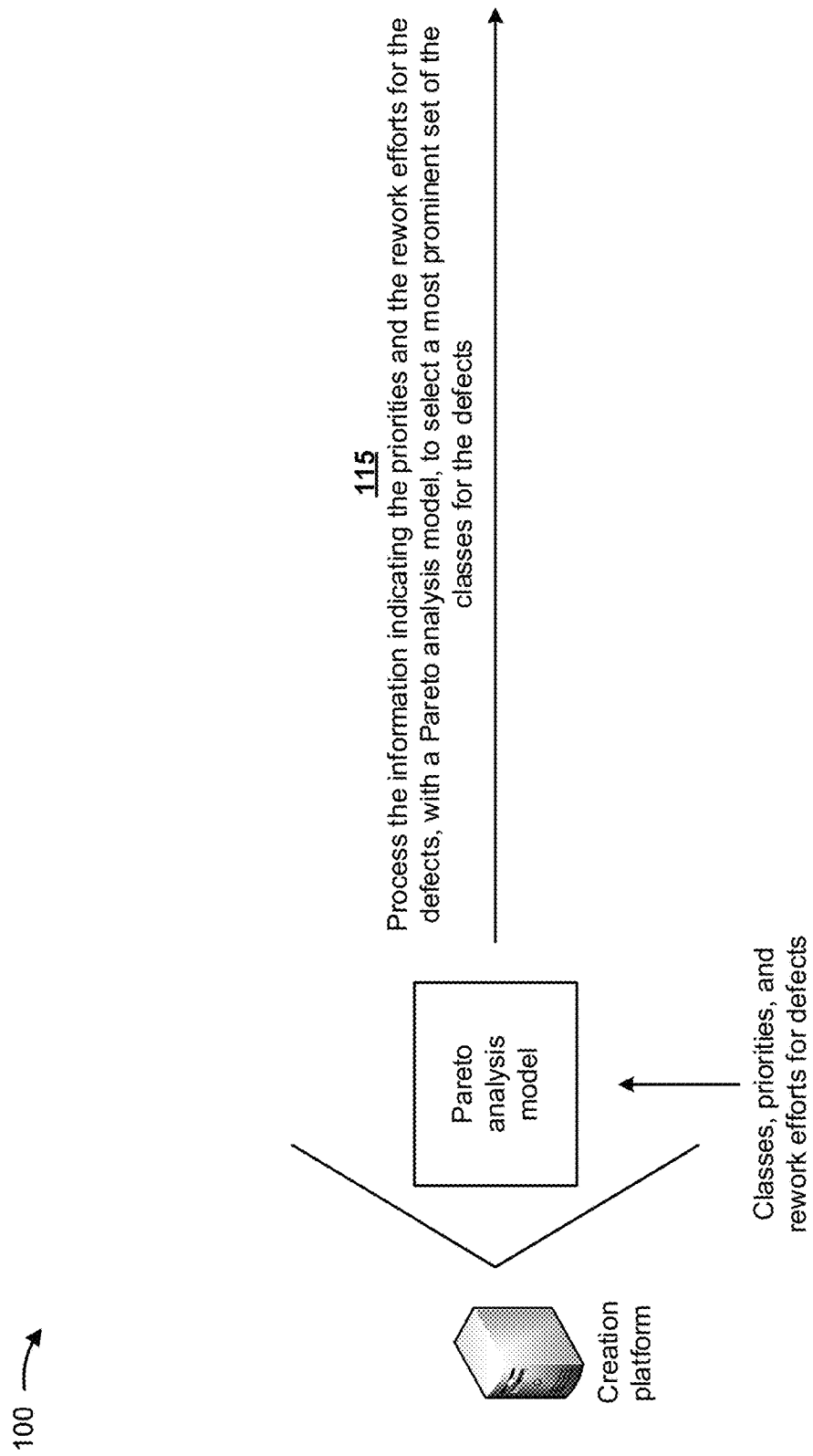

As shown in FIG. 1C, and by reference number 115, the creation platform may process the information indicating the priorities and the rework efforts for the defects, with a Pareto analysis model, to select a most prominent set of the classes for the defects. In some implementations, the Pareto analysis model may include a model that estimates the quantity of defects associated with each of the classes for the defects, and selects a set of defect classes with the greatest quantities of defects as a most prominent set of defect classes (e.g., the most prominent set of the classes for the defects). In some implementations, the Pareto analysis model may generate quantities of defects in each class as percentages and may arrange the classes in decreasing order of quantities of defects in a table (e.g., with the defect class with the most defects first). The Pareto analysis model may add a cumulative percentage column to the table, may plot a curve with classes on the x-axis and cumulative percentage on the y-axis, and may plot a bar graph with classes on the x-axis and percent frequency on the y-axis. The Pareto analysis model may generate a horizontal dotted line at a particular percent frequency (e.g., 80%) from the y-axis to intersect the curve and may generate a vertical dotted line from the point of intersection to the x-axis. The vertical dotted line may separate important classes for defects (on the left, e.g., the most prominent set of the classes for the defects) and trivial classes for defects (on the right).

Figure 1D:
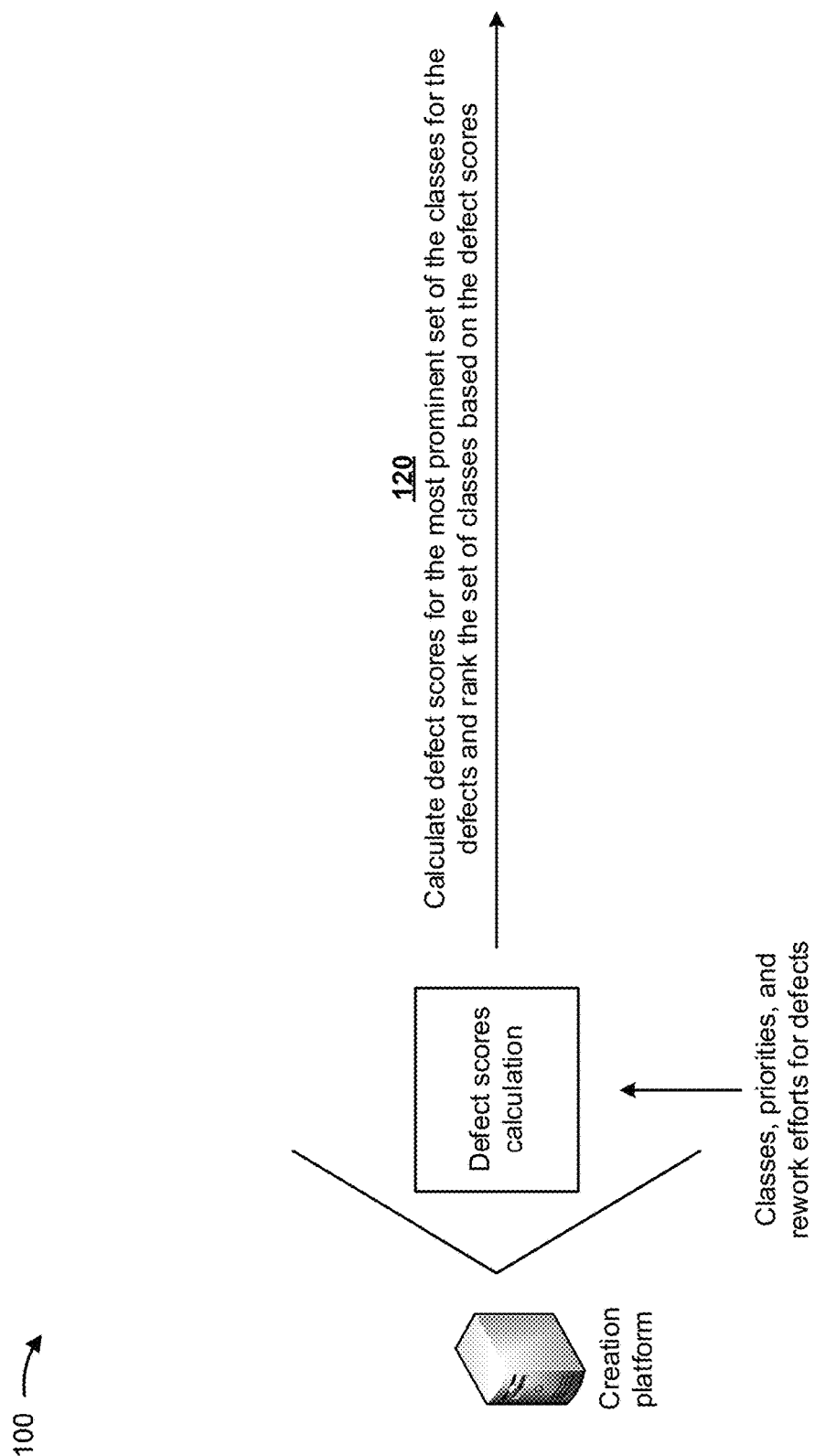

As shown in FIG. 1D, and by reference number 120, the creation platform may calculate defect scores for the most prominent set of classes for the defects and rank the set of classes based on the defect scores. In some implementations, the creation platform may calculate the defect scores for the most prominent set of classes based on quantities of the defects in the set of classes and the priorities associated with the defects in the set of classes. In some implementations, the creation platform may calculate the defect scores for the most prominent set of classes by multiplying the quantities of the defects in the set of classes and the corresponding priorities (e.g., priority weights) associated with the defects in the set of classes. In some implementations, the creation platform may rank the most prominent set of classes for the defects based on the defect scores. For example, a class in the set of classes with a greatest defect score may be ranked first, a class in the set of classes with a next greatest defect score may be ranked second, and/or the like.

Figure 1E:
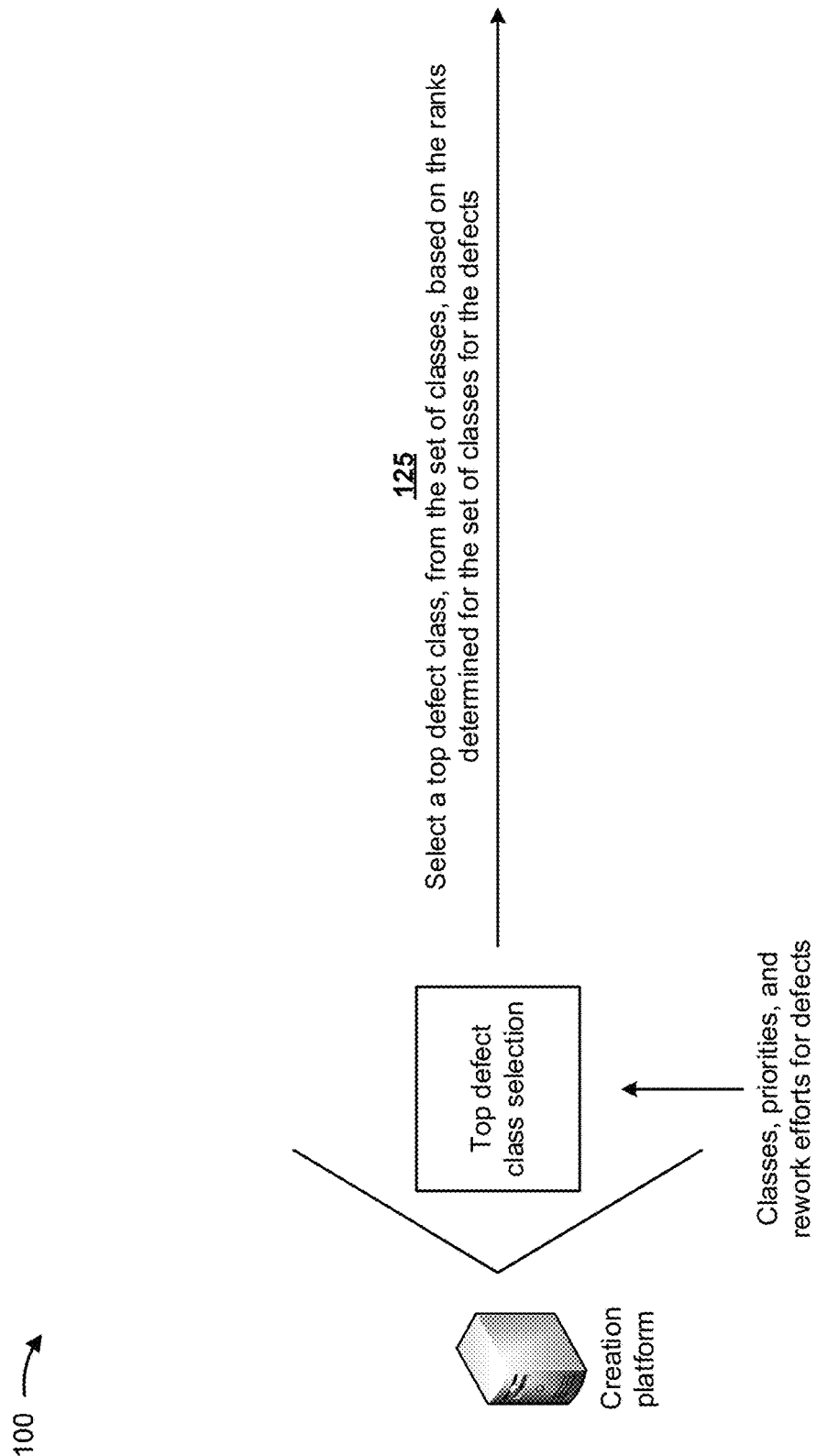

As shown in FIG. 1E, and by reference number 125, the creation platform may select a top defect class, from the set of classes, based on the ranks determined for the set of classes for the defects. In some implementations, the creation platform may select the class in the set of classes with the greatest defect score as the top defect class since the class with the greatest defect score may be ranked first.

Figure 1F:
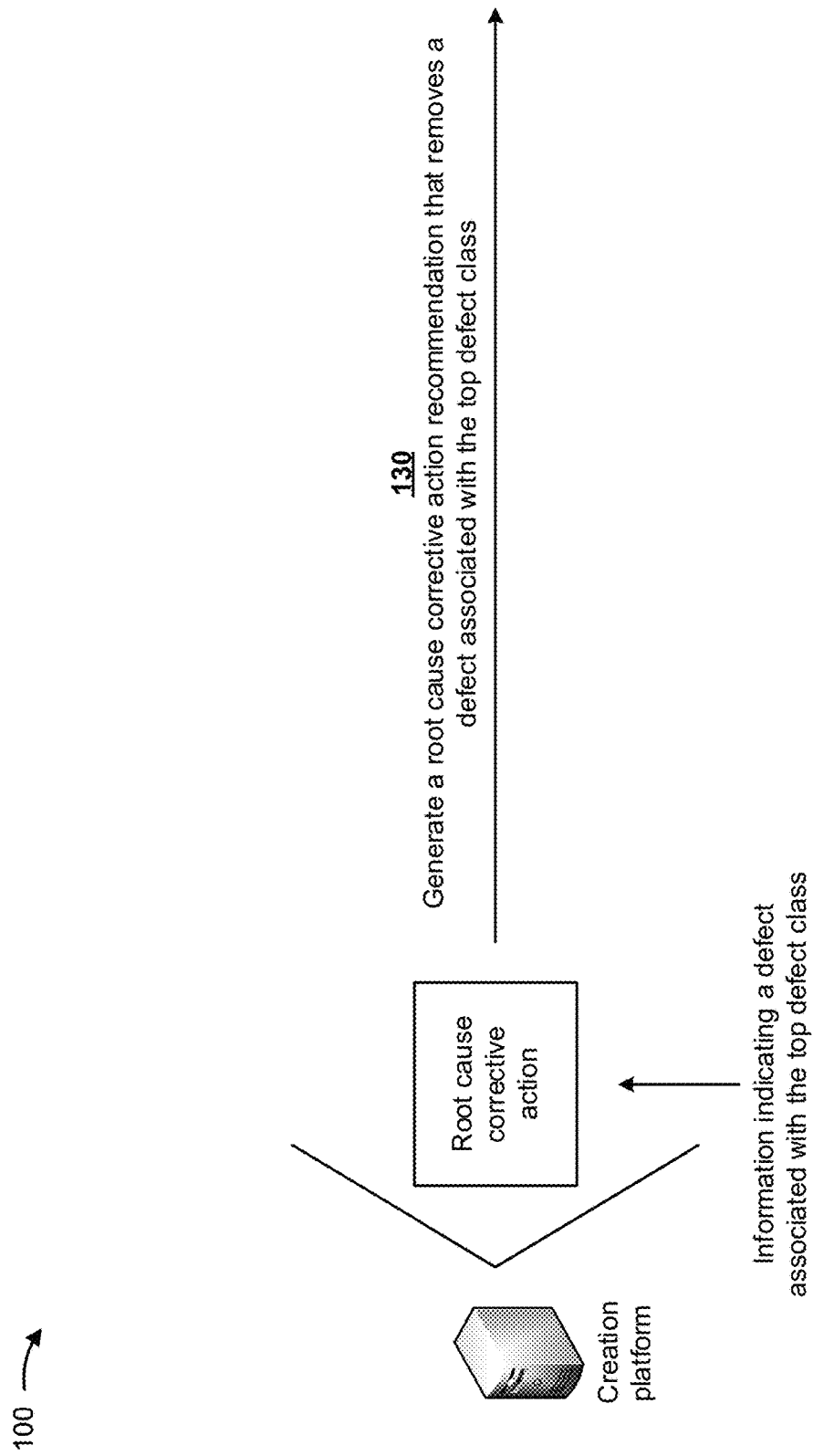

As further shown in FIG. 1F, and by reference number 130, the creation platform may utilize information indicating a defect associated with the top defect class to generate a root cause corrective action recommendation that removes the defect associated with the top defect class. In some implementations, the root cause corrective action recommendation may be implemented to remove the defect associated with the top defect class. In some implementations, the creation platform may process a historical data set associated with a portion (e.g., a percentage) of the top defect class to identify the root cause corrective action recommendation. The historical data set may include a historical collection of data identifying defects associated with the top defect class, root cause corrective action recommendations for correcting the defects, effectiveness of the root cause corrective action recommendations in correcting the defects, and/or the like. In some implementations, the historical data set may be collected from best practices associated with various software projects and mapped to the defects in the top defect class.

In some implementations, when processing the historical data set associated with the portion of the top defect class, the creation platform may process the historical data set associated with the portion of the top defect class, with a fishbone generator model, to generate the root cause corrective action recommendation. In some implementations, the fishbone generator model may generate a causal diagram that shows causes for the defects in the portion of the top defect class. A defect may be represented as a head of a fish, facing to the right, in the diagram, with causes of the defect extending to the left as fishbones, ribs branching off a backbone of the fish for major causes and sub-branches for root-causes, to as many levels as required.

Figure 1G:
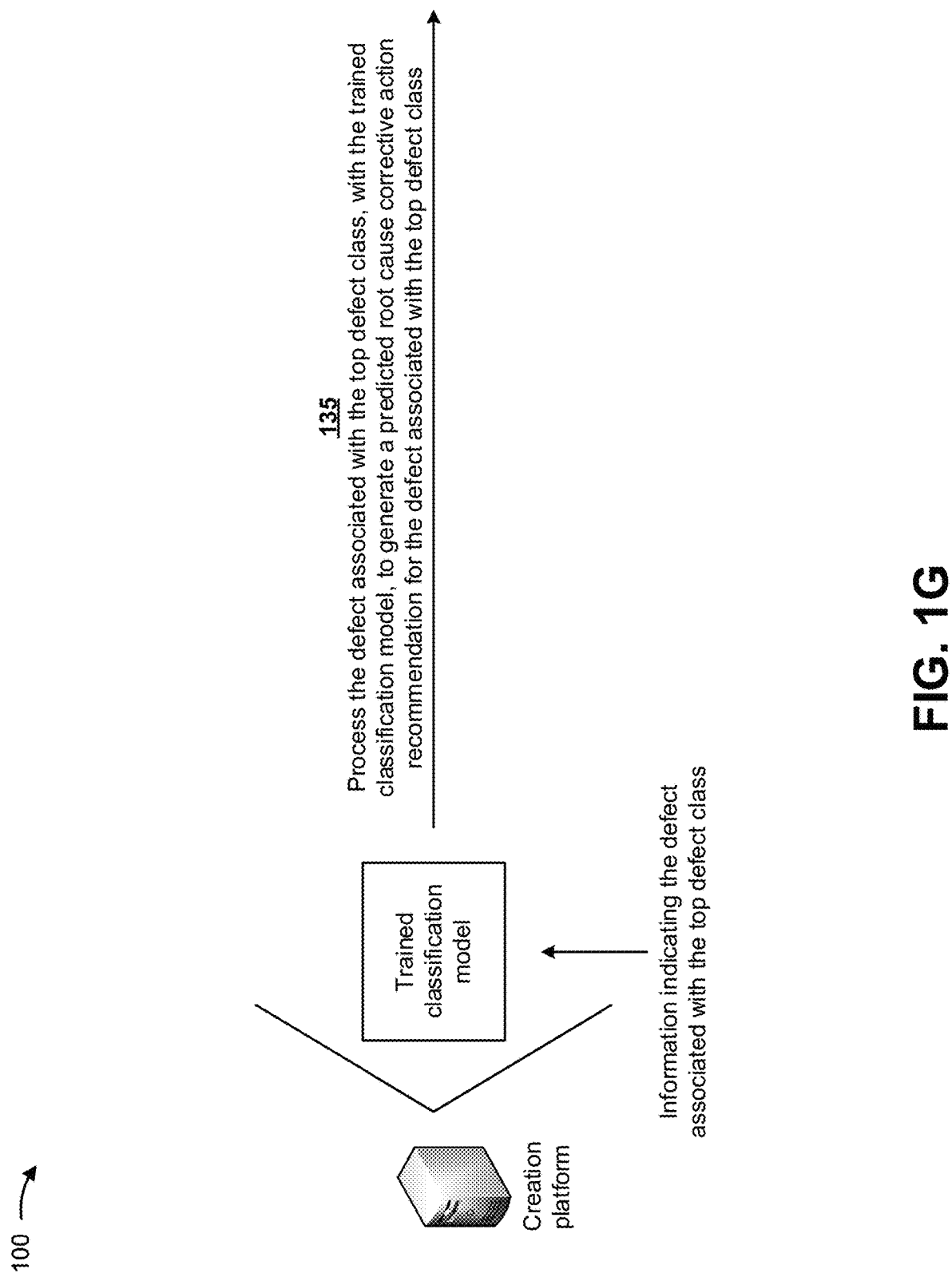

As shown in FIG. 1G, and by reference number 135, the creation platform may process the information indicating the defect associated with the top defect class, with the trained classification model, to generate a predicted root cause corrective action recommendation for the defect associated with the top defect class. In some implementations, the predicted root cause corrective action recommendation may be implemented to remove some or all of the defect associated with the top defect class. In some implementations, the creation platform may determine an effectiveness of the predicted root cause corrective action recommendation in removing the defect associated with the top defect class, as described elsewhere herein. In this way, the creation platform may determine an effectiveness of the retrained classification model based on the effectiveness of the predicted root cause corrective action recommendation in removing the defect associated with the top defect class.

Figure 1H:
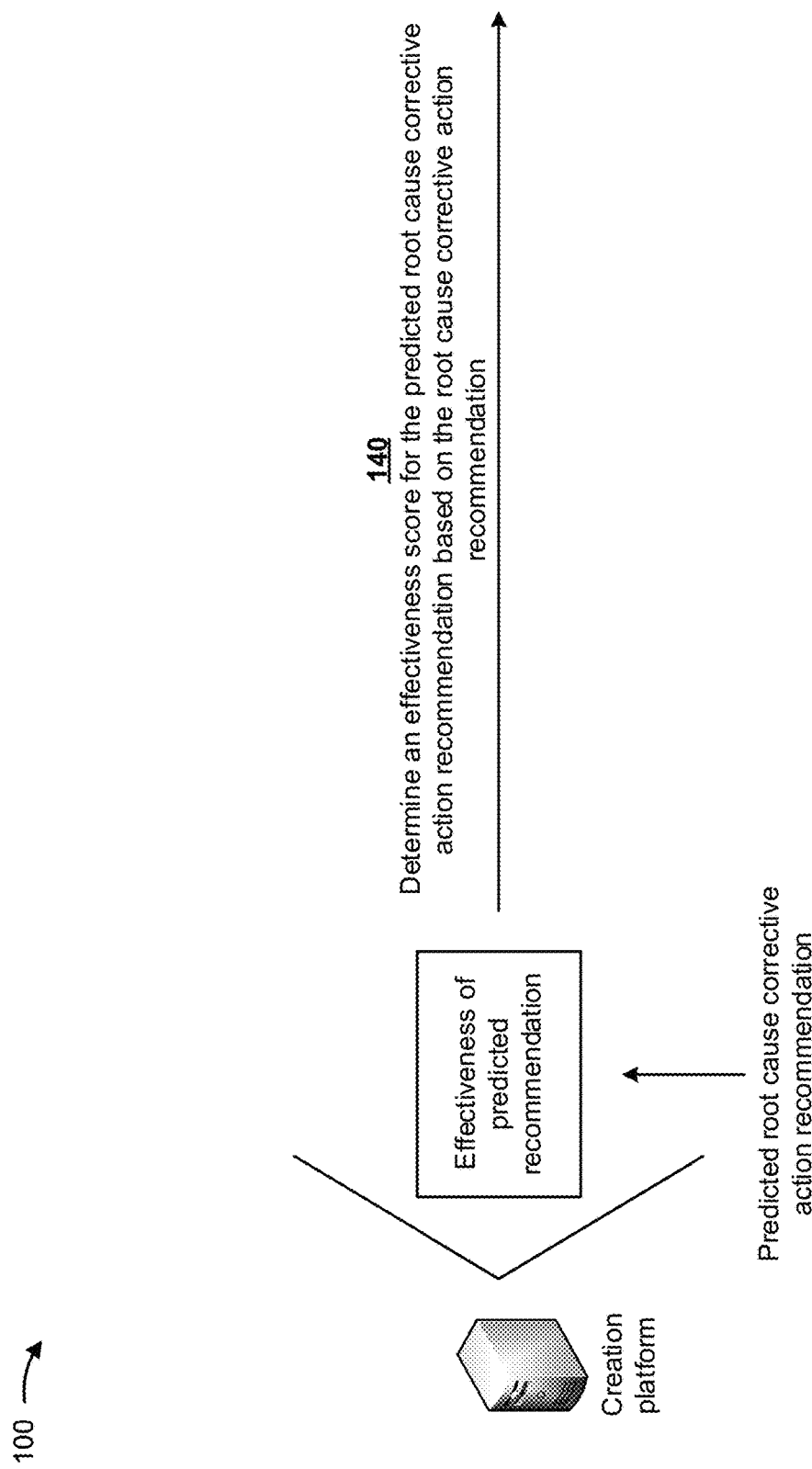

As shown in FIG. 1H, and by reference number 140, the creation platform may determine an effectiveness score for the predicted root cause corrective action recommendation based on the root cause corrective action recommendation. In some implementations, the effectiveness score may provide a measure of an effectiveness of the predicted root cause corrective action recommendation in removing the defect associated with the top defect class, as compared to an effectiveness of the root cause corrective action recommendation in removing the defect associated with the top defect class.

In some implementations, when determining the effectiveness score, the creation platform may process the predicted root cause corrective action recommendation and the root cause corrective action recommendation, with the linear regression model described above, to determine the effectiveness score. In some implementations, the effectiveness score may be determined based on a quantity of defects encountered before implementation of the predicted root cause corrective action recommendation, a quantity of defects encountered after implementation of the predicted root cause corrective action recommendation, information indicating a rework effort required before implementation of the predicted root cause corrective action recommendation, information indicating a rework effort required after implementation of the predicted root cause corrective action recommendation, and/or the like.

In some implementations, the creation platform may determine an effectiveness score for the root cause corrective action recommendation based on a quantity of defects encountered before implementation of the root cause corrective action recommendation, a quantity of defects encountered after implementation of the root cause corrective action recommendation, information indicating a rework effort required before implementation of the root cause corrective action recommendation, information indicating a rework effort required after implementation of the root cause corrective action recommendation, and/or the like. In such implementations, the creation platform may determine the effectiveness score for the predicted root cause corrective action recommendation based on the effectiveness score determined for the root cause corrective action recommendation.

In some implementations, the effectiveness score may include a predicted effectiveness score and an actual effectiveness score. The predicted effectiveness score may be computed before an actual corrective action is taken. The predicted effectiveness score may be computed based on historical data and performing linear regression to arrive at a predication of effectiveness in terms of effort saving and quantity of defect reductions that would result if corrective action is taken. The actual effectiveness score may be computed after the corrective action is taken and may be based on a recommendation. A difference between the predicted effectiveness score and the actual effectiveness score may be utilized to retrain the predicted effectiveness score by updating historical data with the actual effectiveness score.

Figure 1I:
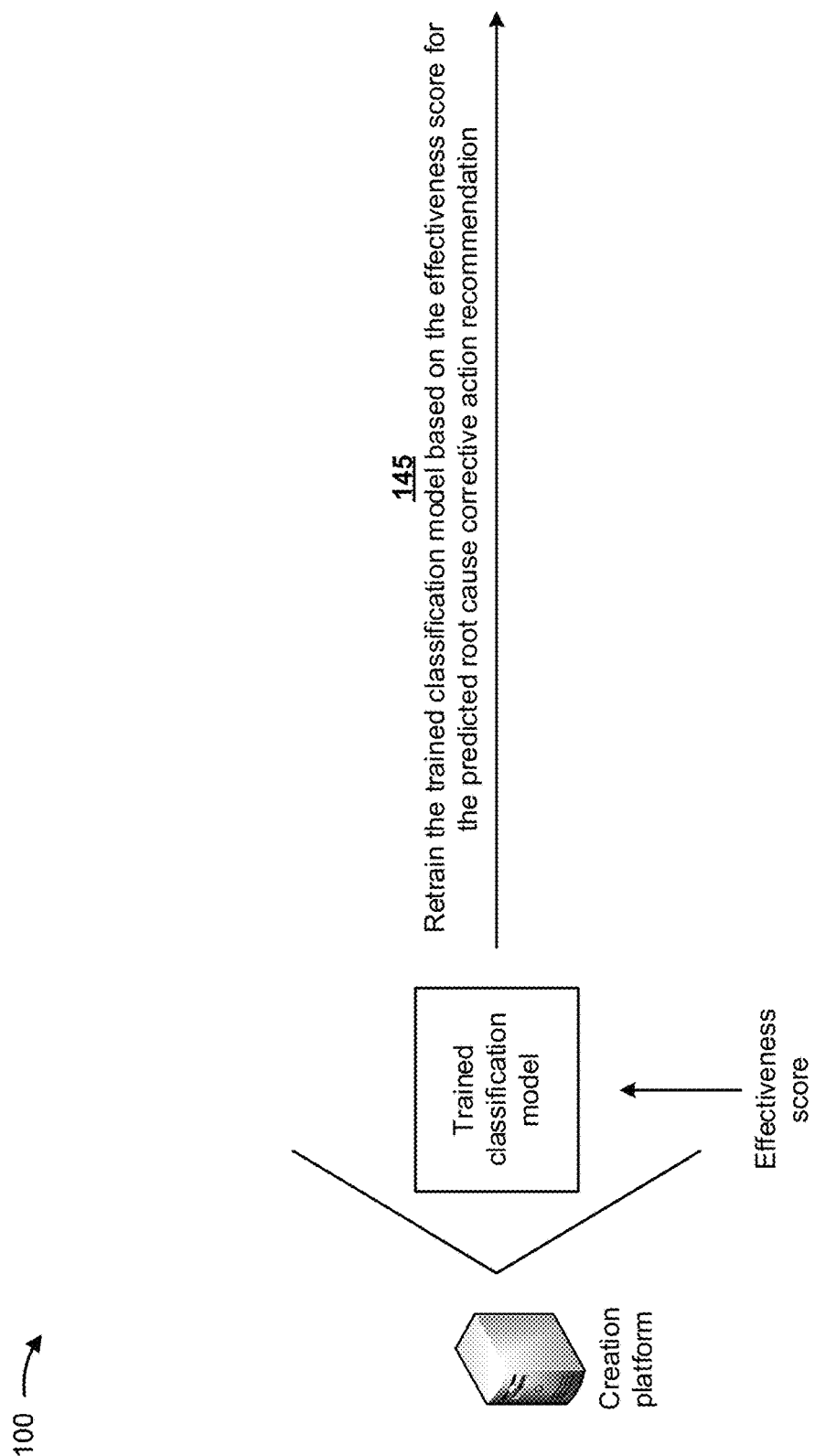

As shown in FIG. 1I, and by reference number 145, the creation platform may retrain the trained classification model based on the effectiveness score for the predicted root cause corrective action recommendation. In some implementations, the creation platform may update the historical data set associated with the portion of the top defect class to include data identifying additional defects determined during calculations of effectiveness scores for the defects of the top defect class, additional priorities associated with the additional defects, additional rework efforts associated with the additional defects, additional root cause corrective action recommendations for correcting the additional defects, and/or the like. In such implementations, the creation platform may retrain the trained classification model with the updated historical data set associated with the portion of the top defect class. In this way, the trained classification model may generate improved predicted root cause corrective action recommendations over a model that is not retrained with the updated historical data set.

Figure 1J:
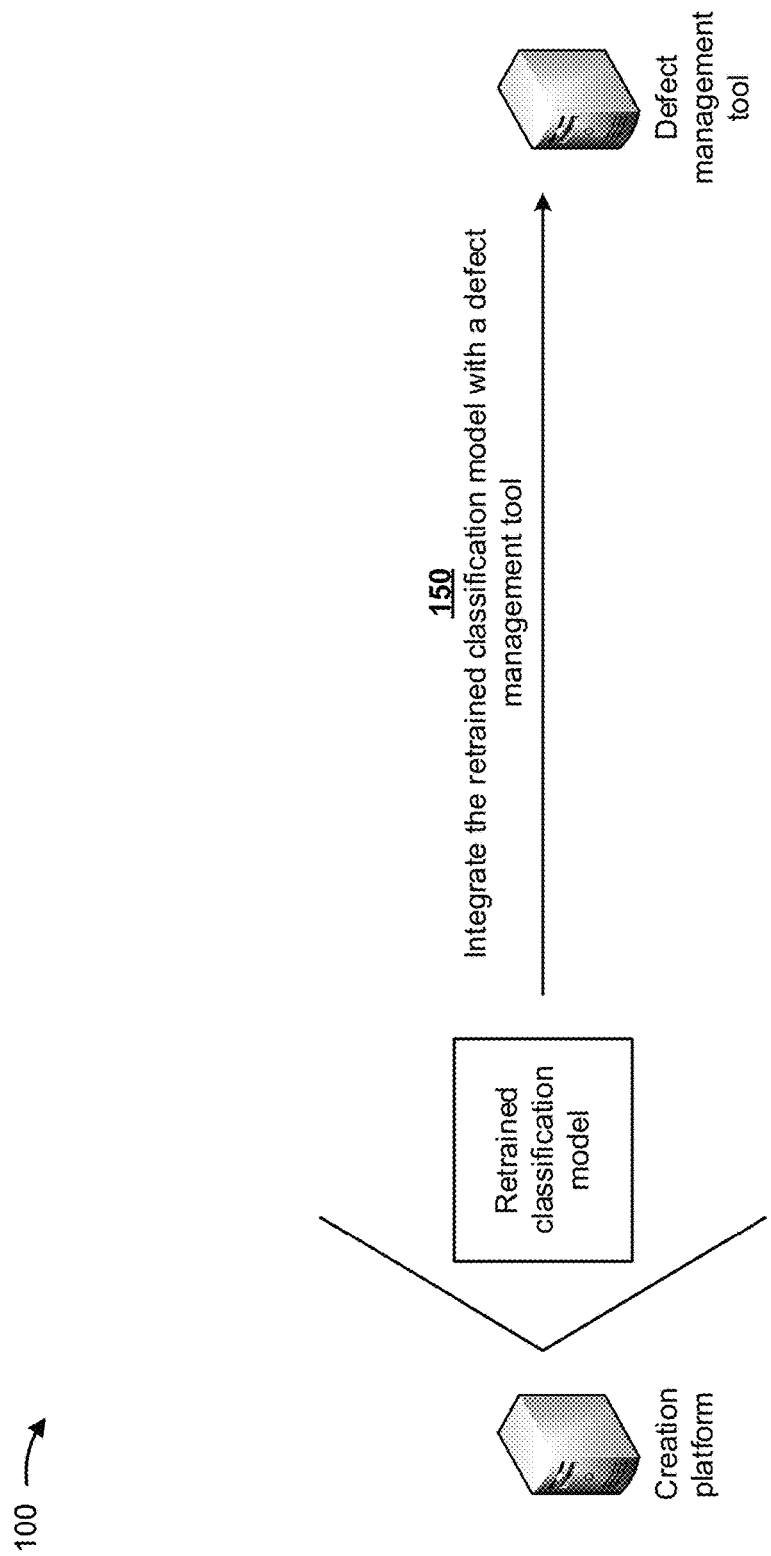

As shown in FIG. 1J, and by reference number 150, the creation platform may integrate the retrained classification model with a defect management tool. In some implementations, the defect management tool may include a tool that provides a centralized repository for tracking defects across projects, provides automated notifications of resource assignments, defines defect resolution status in order to map back to a defect management process, provides management reporting (e.g., a quantity of open defects grouped by various criteria, such as open defects by project, severity, priority, etc.), and/or the like. In some implementations, the defect management tool may include a Jira® defect management tool, an application lifecycle management (ALM) too, and/or the like.

In some implementations, the creation platform may receive, from the defect management tool, information indicating a new defect and may process the new defect, with the retrained classification model, to generate a particular root cause corrective action recommendation. The creation platform may provide the particular root cause corrective action recommendation to the defect management tool to enable the defect management tool to implement the particular root cause corrective action recommendation.

Figure 1K:
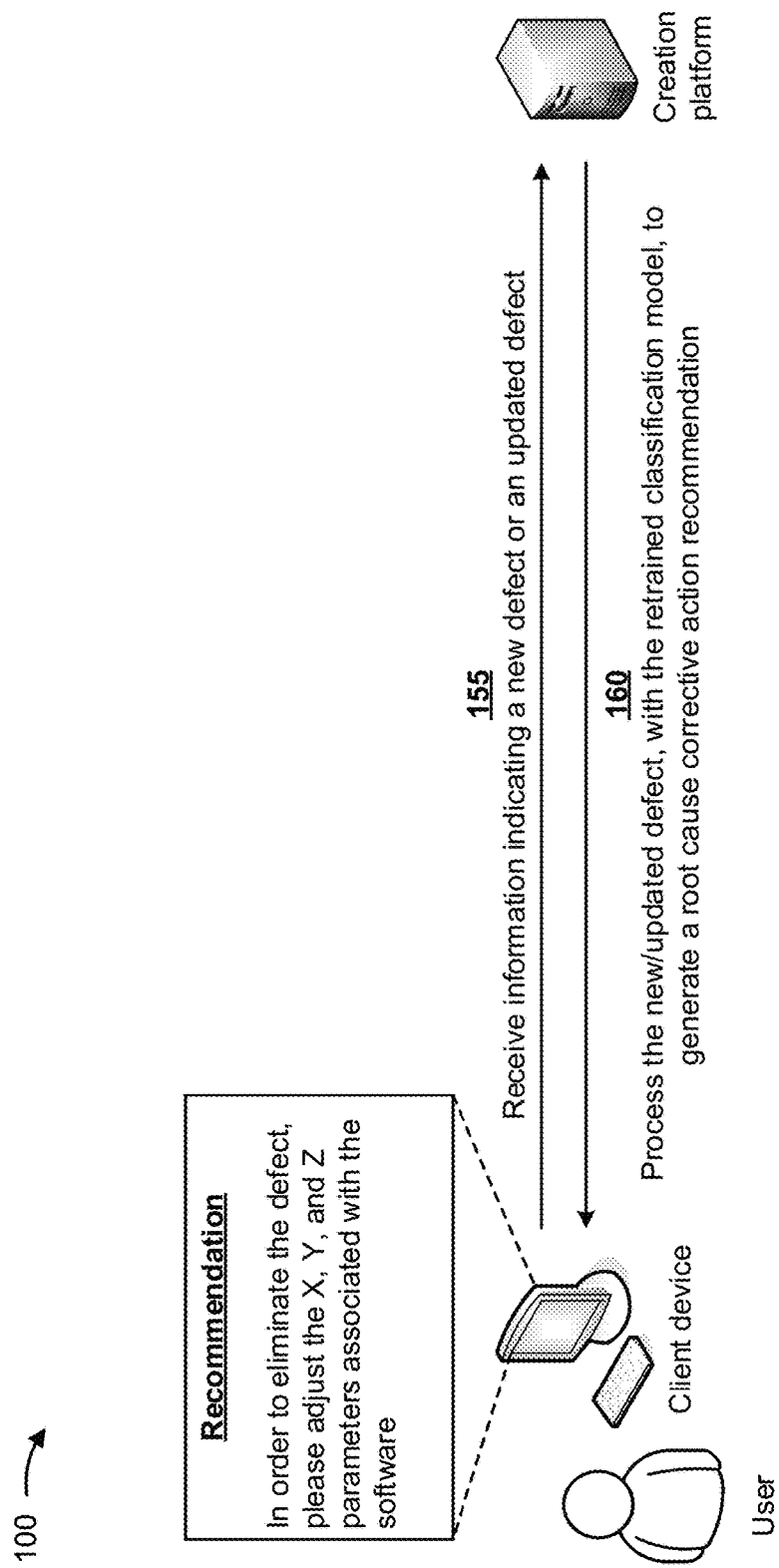

As shown in FIG. 1K, the user may utilize the client device to input a new defect or an updated defect associated with a software application and to provide information indicating the new defect or the updated defect to the creation platform. As shown in FIG. 1K, and by reference number 155, the creation platform may receive, from the client device, the information indicating the new defect or the updated defect. As further shown in FIG. 1K, and by reference number 160, the creation platform may process the new defect or the updated defect, with the retrained classification model, to generate a root cause corrective action recommendation. The creation platform may provide, to the client device, information indicating the root cause corrective action recommendation. In some implementations, the client device may receive the information indicating the root cause corrective action recommendation and may display the information indicating the root cause corrective action recommendation to the user. In some implementations, the information indicating the root cause corrective action recommendation may include information indicating that to eliminate the new defect or the updated defect, the user should adjust parameters (e.g., X, Y, and Z parameters) associated with the software application.

Figure 1L:
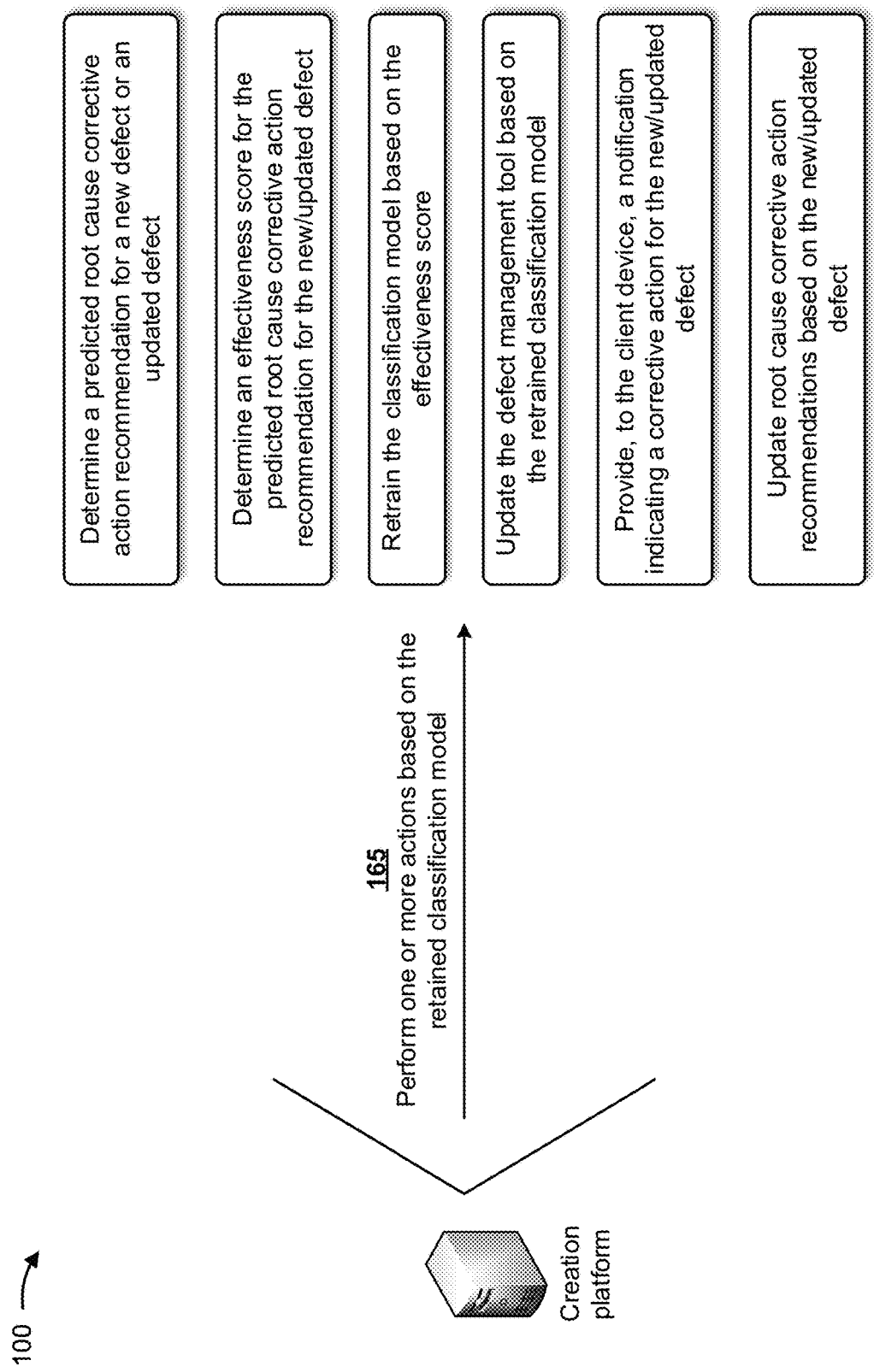

As shown in FIG. 1L, and by reference number 165, the creation platform may perform one or more actions based on the retrained classification model. In some implementations, the one or more actions may include determining a predicted root cause corrective action recommendation for a new defect or an updated defect. For example, as described in connection with FIG. 1K, the creation platform may utilize the retrained classification model to determine a predicted root cause corrective action recommendation for a new defect or an updated defect. In this way, the creation platform may enable correction of new defects and/or updated defects.

In some implementations, the one or more actions may include determining an effectiveness score for the predicted root cause corrective action recommendation for the new/updated defect. For example, the creation platform may determine the effectiveness score for the predicted root cause corrective action recommendation, as described above in connection with FIG. 1H. In this way, the creation platform may determine an effectiveness of the predicted root cause corrective action recommendation.

In some implementations, the one or more actions may include retraining the classification model based on the effectiveness score. For example, the creation platform may retrain the classification model based on the effectiveness score for the predicted root cause corrective action recommendation, as described above in connection with FIG. 1I. In this way, the creation platform may improve the predictive capabilities of the classification model.

In some implementations, the one or more actions may include updating the defect management tool based on the retrained classification model. For example, the creation platform may provide the retrained classification model to the defect management tool for utilization. In this way, the creation platform may ensure that the defect management tool provides improved predictions.

In some implementations, the one or more actions may include providing, to the client device, a notification indicating a corrective action for the new/updated defect. For example, the creation platform may provide, to the client device, a notification (e.g., via an email, a telephone call, a text message, and/or the like) indicating the corrective action. In this way, the creation platform may ensure that users are immediately made aware of corrective actions for new defects and/or updated defects.

In some implementations, the one or more actions may include updating the root cause corrective action recommendations based on the new/updated defect. In this way, the creation platform may ensure that an appropriate corrective action recommendation is provided for the new defect and/or the updated defect.

In this way, several different stages of the process for updating a root cause analysis classification model are automated via artificial intelligence, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes artificial intelligence to generate and update a root cause analysis classification model. Finally, automating the process for updating a root cause analysis classification model conserves computing resources (e.g., processing resources, memory resources, and/or the like) that would otherwise be wasted in attempting to identify issues with the classification model and update the classification model to address the issues.

As indicated above, FIGS. 1A-1L are provided merely as examples. Other examples may differ from what is described with regard to FIGS. 1A-1L.

Figure 2:
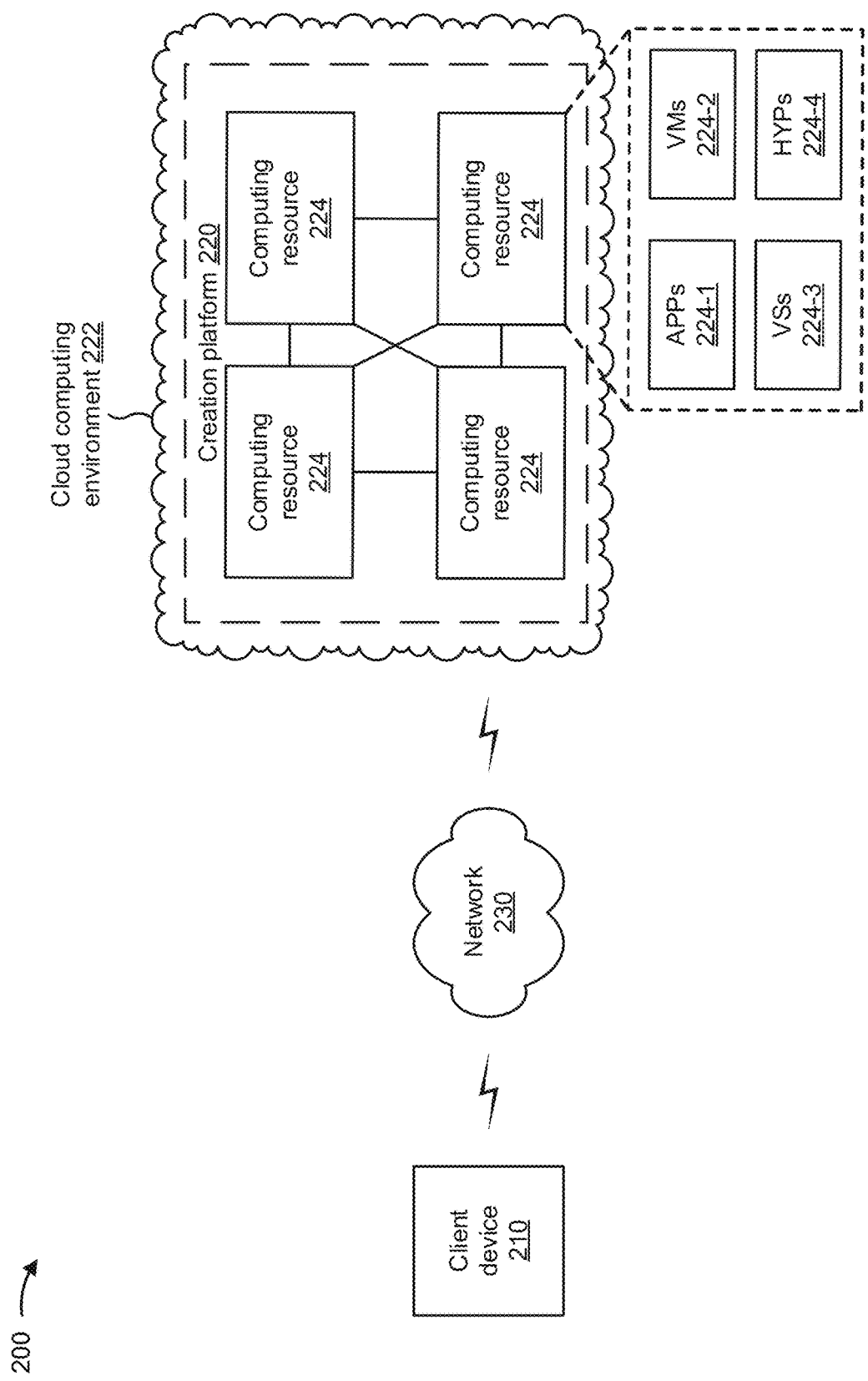
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a creation platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to creation platform 220.

Creation platform 220 includes one or more devices that utilize artificial intelligence to generate and update a root cause analysis classification model. In some implementations, creation platform 220 may be designed to be modular such that certain software components may be swapped in or out depending on a particular need. As such, creation platform 220 may be easily and/or quickly reconfigured for different uses. In some implementations, creation platform 220 may receive information from and/or transmit information to one or more client devices 210.

In some implementations, as shown, creation platform 220 may be hosted in a cloud computing environment 222. Notably, while implementations described herein describe creation platform 220 as being hosted in cloud computing environment 222, in some implementations, creation platform 220 may not be cloud-based (i.e., may be implemented outside of a cloud computing environment) or may be partially cloud-based.

Cloud computing environment 222 includes an environment that hosts creation platform 220. Cloud computing environment 222 may provide computation, software, data access, storage, etc., services that do not require end-user knowledge of a physical location and configuration of system(s) and/or device(s) that hosts creation platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host creation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with creation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of creation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
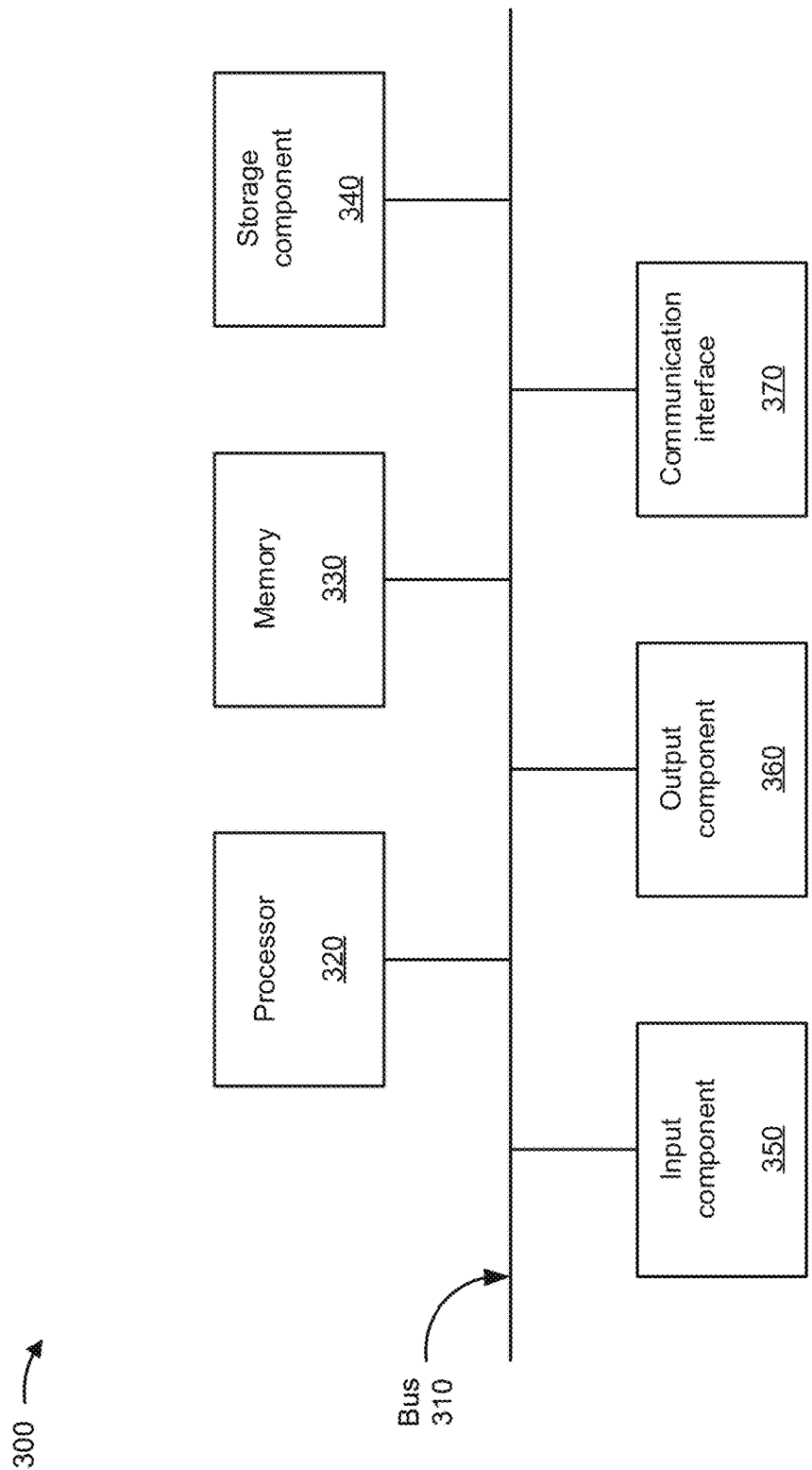
FIG. 3 is a diagram of example components of one or more devices of FIG. 2.

FIG. 3 is a diagram of example components of a device 300. Device 300 may correspond to client device 210, creation platform 220, and/or computing resource 224. In some implementations, client device 210, creation platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
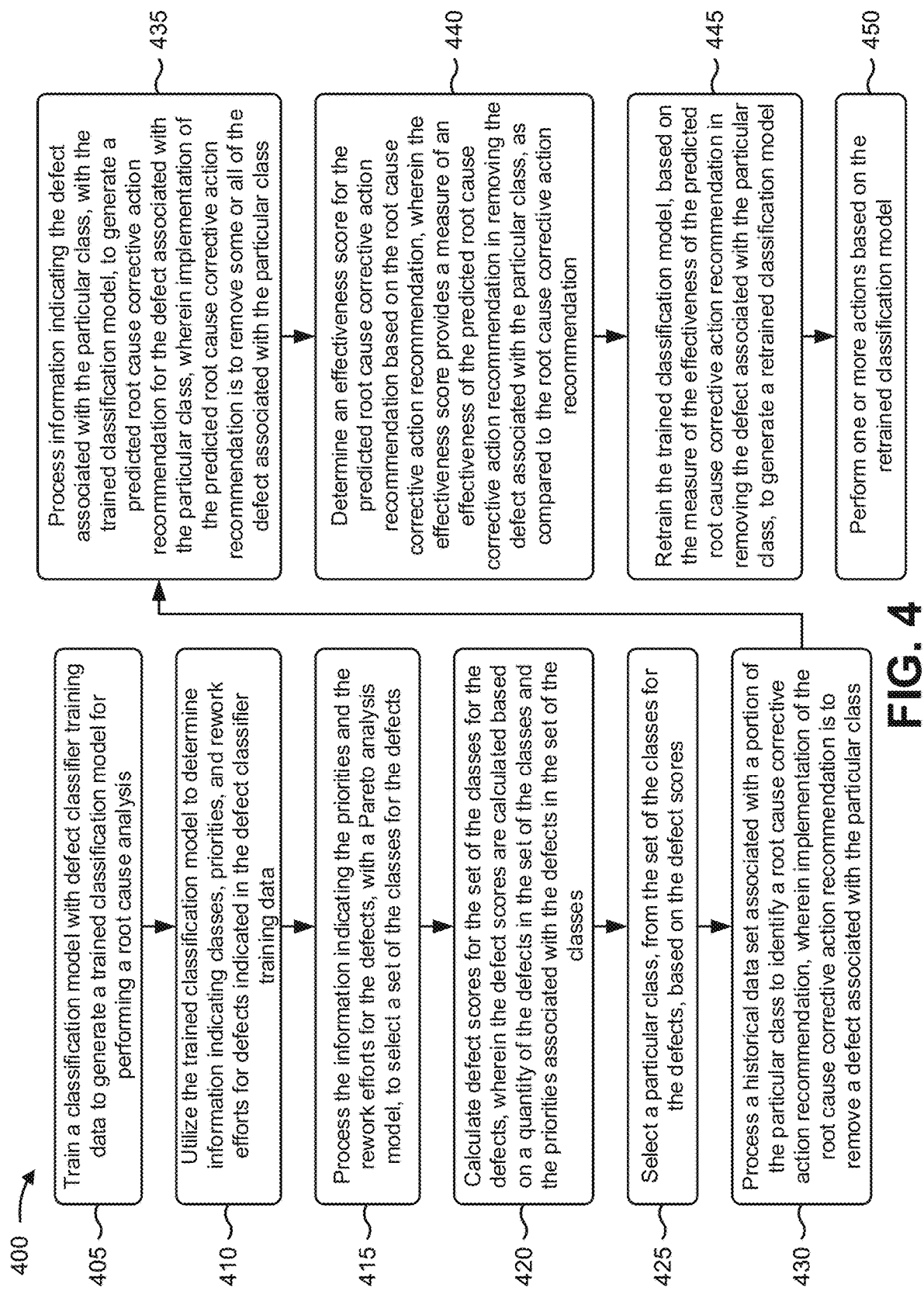
FIGS. 4-6 are flow charts of example processes for utilizing artificial intelligence to generate and update a root cause analysis classification model.

FIG. 4 is a flow chart of an example process 400 for utilizing artificial intelligence to generate and update a root cause analysis classification model. In some implementations, one or more process blocks of FIG. 4 may be performed by a creation platform (e.g., creation platform 220). In some implementations, one or more process blocks of FIG. 4 may be performed by another device or a group of devices separate from or including the creation platform, such as a client device (e.g., client device 210).

As shown in FIG. 4, process 400 may include training a classification model with defect classifier training data to generate a trained classification model for performing a root cause analysis (block 405). For example, the creation platform (e.g., using computing resource 224, processor 320, memory 330, and/or the like) may train a classification model with defect classifier training data to generate a trained classification model for performing a root cause analysis, as described above in connection with FIGS. 1A-2.

As further shown in FIG. 4, process 400 may include utilizing the trained classification model to determine information indicating classes, priorities, and rework efforts for defects indicated in the defect classifier training data (block 410). For example, the creation platform (e.g., using computing resource 224, processor 320, storage component 340, and/or the like) may utilize the trained classification model to determine information indicating classes, priorities, and rework efforts for defects indicated in the defect classifier training data, as described above in connection with FIGS. 1A-2.

As further shown in FIG. 4, process 400 may include processing the information indicating the priorities and the rework efforts for the defects, with a Pareto analysis model, to select a set of the classes for the defects (block 415). For example, the creation platform (e.g., using computing resource 224, processor 320, memory 330, storage component 340, and/or the like) may process the information indicating the priorities and the rework efforts for the defects, with a Pareto analysis model, to select a set of the classes for the defects, as described above in connection with FIGS. 1A-2.

As further shown in FIG. 4, process 400 may include calculating defect scores for the set of the classes for the defects, wherein the defect scores are calculated based on a quantity of the defects in the set of the classes and the priorities associated with the defects in the set of the classes (block 420). For example, the creation platform (e.g., using computing resource 224, processor 320, storage component 340, and/or the like) may calculate defect scores for the set of the classes for the defects, as described above in connection with FIGS. 1A-2. In some implementations, the defect scores may be calculated based on a quantity of the defects in the set of the classes and the priorities associated with the defects in the set of the classes.

As further shown in FIG. 4, process 400 may include selecting a particular class, from the set of the classes for the defects, based on the defect scores (block 425). For example, the creation platform (e.g., using computing resource 224, processor 320, memory 330, and/or the like) may select a particular class, from the set of the classes for the defects, based on the defect scores, as described above in connection with FIGS. 1A-2.

As further shown in FIG. 4, process 400 may include processing a historical data set associated with a portion of the particular class to identify a root cause corrective action recommendation, wherein implementation of the root cause corrective action recommendation is to remove a defect associated with the particular class (block 430). For example, the creation platform (e.g., using computing resource 224, processor 320, storage component 340, communication interface 370, and/or the like) may process a historical data set associated with a portion of the particular class to identify a root cause corrective action recommendation, as described above in connection with FIGS. 1A-2. In some implementations, implementation of the root cause corrective action recommendation may be to remove a defect associated with the particular class.

As further shown in FIG. 4, process 400 may include processing information indicating the defect associated with the particular class, with the trained classification model, to generate a predicted root cause corrective action recommendation for the defect associated with the particular class, wherein implementation of the predicted root cause corrective action recommendation is to remove some or all of the defect associated with the particular class (block 435). For example, the creation platform (e.g., using computing resource 224, processor 320, storage component 340, communication interface 370, and/or the like) may process information indicating the defect associated with the particular class, with the trained classification model, to generate a predicted root cause corrective action recommendation for the defect associated with the particular class, as described above in connection with FIGS. 1A-2. In some implementations, implementation of the predicted root cause corrective action recommendation may be to remove some or all of the defect associated with the particular class.

As further shown in FIG. 4, process 400 may include determining an effectiveness score for the predicted root cause corrective action recommendation based on the root cause corrective action recommendation, wherein the effectiveness score provides a measure of an effectiveness of the predicted root cause corrective action recommendation in removing the defect associated with the particular class, as compared to the root cause corrective action recommendation (block 440). For example, the creation platform (e.g., using computing resource 224, processor 320, storage component 340, communication interface 370, and/or the like) may determine an effectiveness score for the predicted root cause corrective action recommendation based on the root cause corrective action recommendation, as described above in connection with FIGS. 1A-2. In some implementations, the effectiveness score may provide a measure of an effectiveness of the predicted root cause corrective action recommendation in removing the defect associated with the particular class, as compared to the root cause corrective action recommendation.

As further shown in FIG. 4, process 400 may include retraining the trained classification model, based on the measure of the effectiveness of the predicted root cause corrective action recommendation in removing the defect associated with the particular class, to generate a retrained classification model (block 445). For example, the creation platform (e.g., using computing resource 224, processor 320, storage component 340, communication interface 370, and/or the like) may retrain the trained classification model, based on the measure of the effectiveness of the predicted root cause corrective action recommendation in removing the defect associated with the particular class, to generate a retrained classification model, as described above in connection with FIGS. 1A-2.

As further shown in FIG. 4, process 400 may include performing one or more actions based on the retrained classification model (block 450). For example, the creation platform (e.g., using computing resource 224, processor 320, storage component 340, communication interface 370, and/or the like) may perform one or more actions based on the retrained classification model, as described above in connection with FIGS. 1A-2.

Process 400 may include additional implementations, such as any single implementation or any combination of implementations described below and/or described with regard to any other process described herein.

In some implementations, the creation platform may cause the retrained classification model to be integrated with one or more defect management tools. In some implementations, the creation platform may receive, from a client device, information indicating a new defect or an updated defect, may process the new defect or the updated defect, with the retrained classification model, to generate a particular root cause corrective action recommendation, and may provide the particular root cause corrective action recommendation to the client device.

In some implementations, when performing the one or more actions, the creation platform may determine, with the retrained classification model, a predicted root cause corrective action recommendation for a new defect or an updated defect, may determine an effectiveness score for the predicted root cause corrective action recommendation for the new defect or the updated defect, may retrain the retrained classification model based on the effectiveness score for the predicted root cause corrective action recommendation for the new defect or the updated defect, may update one or more defect management tools based on the retrained classification model, may provide, to a client device, the predicted root cause corrective action recommendation for the new defect or the updated defect, and/or may update root cause corrective action recommendations based on the predicted root cause corrective action recommendation for the new defect or the updated defect.

In some implementations, the classification model may include a deep neural network (DNN) multi-label classification model. In some implementations, when utilizing the trained classification model to generate the classes, the priorities, and the rework efforts, the creation platform may process the defect classifier training data, with the trained classification model, to determine information indicating the classes for the defects, may process the defect classifier training data, with a count vector, a cosine scorer, and a linear regression model, to determine information indicating the priorities for the defects, and may process the defect classifier training data, with the count vector and the linear regression model, to determine information indicating the rework efforts for the defects.

In some implementations, when processing the historical data set associated with the portion of the particular class, the creation platform may process the historical data set associated with the portion of the particular class, with a fishbone generator model, to generate the root cause corrective action recommendation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
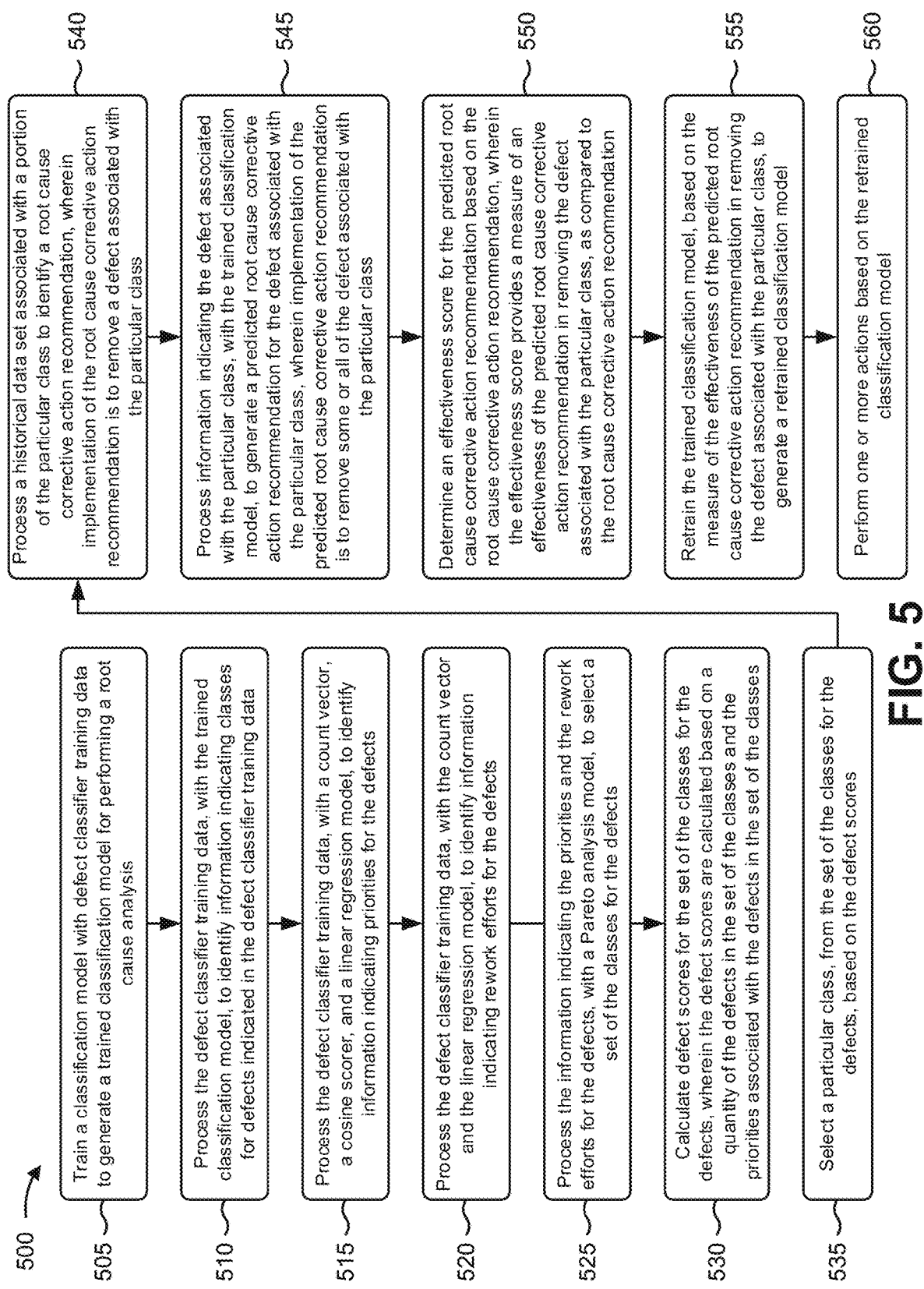

FIG. 5 is a flow chart of an example process 500 for utilizing artificial intelligence to generate and update a root cause analysis classification model. In some implementations, one or more process blocks of FIG. 5 may be performed by a creation platform (e.g., creation platform 220). In some implementations, one or more process blocks of FIG. 5 may be performed by another device or a group of devices separate from or including the creation platform, such as a client device (e.g., client device 210).

As shown in FIG. 5, process 500 may include training a classification model with defect classifier training data to generate a trained classification model for performing a root cause analysis (block 505). For example, the creation platform (e.g., using computing resource 224, processor 320, memory 330, and/or the like) may train a classification model with defect classifier training data to generate a trained classification model for performing a root cause analysis, as described above in connection with FIGS. 1A-2.

As further shown in FIG. 5, process 500 may include processing the defect classifier training data, with the trained classification model, to identify information indicating classes for defects indicated in the defect classifier training data (block 510). For example, the creation platform (e.g., using computing resource 224, processor 320, storage component 340, and/or the like) may process the defect classifier training data, with the trained classification model, to identify information indicating classes for defects indicated in the defect classifier training data, as described above in connection with FIGS. 1A-2.

As further shown in FIG. 5, process 500 may include processing the defect classifier training data, with a count vector, a cosine scorer, and/or a linear regression model, to identify information indicating priorities for the defects (block 515). For example, the creation platform (e.g., using computing resource 224, processor 320, memory 330, and/or the like) may process the defect classifier training data, with a count vector, a cosine scorer, and a linear regression model, to identify information indicating priorities for the defects, as described above in connection with FIGS. 1A-2.

As further shown in FIG. 5, process 500 may include processing the defect classifier training data, with the count vector and the linear regression model, to identify information indicating rework efforts for the defects (block 520). For example, the creation platform (e.g., using computing resource 224, processor 320, memory 330, storage component 340, and/or the like) may process the defect classifier training data, with the count vector and the linear regression model, to identify information indicating rework efforts for the defects, as described above in connection with FIGS. 1A-2.

As further shown in FIG. 5, process 500 may include processing the information indicating the priorities and the rework efforts for the defects, with a Pareto analysis model, to select a set of the classes for the defects (block 525). For example, the creation platform (e.g., using computing resource 224, processor 320, memory 330, and/or the like) may process the information indicating the priorities and the rework efforts for the defects, with a Pareto analysis model, to select a set of the classes for the defects, as described above in connection with FIGS. 1A-2.

As further shown in FIG. 5, process 500 may include calculating defect scores for the set of the classes for the defects, wherein the defect scores are calculated based on a quantity of the defects in the set of the classes and the priorities associated with the defects in the set of the classes (block 530). For example, the creation platform (e.g., using computing resource 224, processor 320, storage component 340, and/or the like) may calculate defect scores for the set of the classes for the defects, as described above in connection with FIGS. 1A-2. In some implementations, the defect scores may be calculated based on a quantity of the defects in the set of the classes and the priorities associated with the defects in the set of the classes.

As further shown in FIG. 5, process 500 may include selecting a particular class, from the set of the classes for the defects, based on the defect scores (block 535). For example, the creation platform (e.g., using computing resource 224, processor 320, memory 330, and/or the like) may select a particular class, from the set of the classes for the defects, based on the defect scores, as described above in connection with FIGS. 1A-2.

As further shown in FIG. 5, process 500 may include processing a historical data set associated with a portion of the particular class to identify a root cause corrective action recommendation, wherein implementation of the root cause corrective action recommendation is to remove a defect associated with the particular class (block 540). For example, the creation platform (e.g., using computing resource 224, processor 320, storage component 340, and/or the like) may process a historical data set associated with a portion of the particular class to identify a root cause corrective action recommendation, as described above in connection with FIGS. 1A-2. In some implementations, implementation of the root cause corrective action recommendation may remove a defect associated with the particular class.

As further shown in FIG. 5, process 500 may include processing information indicating the defect associated with the particular class, with the trained classification model, to generate a predicted root cause corrective action recommendation for the defect associated with the particular class, wherein implementation of the predicted root cause corrective action recommendation is to remove some or all of the defect associated with the particular class (block 545). For example, the creation platform (e.g., using computing resource 224, processor 320, memory 330, and/or the like) may process information indicating the defect associated with the particular class, with the trained classification model, to generate a predicted root cause corrective action recommendation for the defect associated with the particular class, as described above in connection with FIGS. 1A-2. In some implementations, implementation of the predicted root cause corrective action recommendation may remove some or all of the defect associated with the particular class.

As further shown in FIG. 5, process 500 may include determining an effectiveness score for the predicted root cause corrective action recommendation based on the root cause corrective action recommendation, wherein the effectiveness score provides a measure of an effectiveness of the predicted root cause corrective action recommendation in removing the defect associated with the particular class, as compared to the root cause corrective action recommendation (block 550). For example, the creation platform (e.g., using computing resource 224, processor 320, storage component 340, and/or the like) may determine an effectiveness score for the predicted root cause corrective action recommendation based on the root cause corrective action recommendation, as described above in connection with FIGS. 1A-2. In some implementations, the effectiveness score may provide a measure of an effectiveness of the predicted root cause corrective action recommendation in removing the defect associated with the particular class, as compared to the root cause corrective action recommendation.

As further shown in FIG. 5, process 500 may include retraining the trained classification model, based on the measure of the effectiveness of the predicted root cause corrective action recommendation in removing the defect associated with the particular class, to generate a retrained classification model (block 555). For example, the creation platform (e.g., using computing resource 224, processor 320, memory 330, and/or the like) may retrain the trained classification model, based on the measure of the effectiveness of the predicted root cause corrective action recommendation in removing the defect associated with the particular class, to generate a retrained classification model, as described above in connection with FIGS. 1A-2.

As further shown in FIG. 5, process 500 may include performing one or more actions based on the retrained classification model (block 560). For example, the creation platform (e.g., using computing resource 224, processor 320, memory 330, communication interface 370, and/or the like) may perform one or more actions based on the retrained classification model, as described above in connection with FIGS. 1A-2.

Process 500 may include additional implementations, such as any single implementation or any combination of implementations described below and/or described with regard to any other process described herein.

In some implementations, when determining the effectiveness score, the creation platform may process the predicted root cause corrective action recommendation and the root cause corrective action recommendation, with the linear regression model, to determine the effectiveness score.

In some implementations, the effectiveness score may be based on a quantity of defects encountered before implementation of the predicted root cause corrective action recommendation, a quantity of defects encountered after implementation of the predicted root cause corrective action recommendation, information indicating a rework effort required before implementation of the predicted root cause corrective action recommendation, and/or information indicating a rework effort required after implementation of the predicted root cause corrective action recommendation.

In some implementations, the creation platform may receive, from a client device, information indicating a new defect or an updated defect, may process the new defect or the updated defect, with the retrained classification model, to generate a particular root cause corrective action recommendation, and may provide the particular root cause corrective action recommendation to the client device.

In some implementations, when performing the one or more actions, the creation platform may determine, with the retrained classification model, a predicted root cause corrective action recommendation for a new defect or an updated defect, may determine an effectiveness score for the predicted root cause corrective action recommendation for the new defect or the updated defect, may retrain the retrained classification model based on the effectiveness score for the predicted root cause corrective action recommendation for the new defect or the updated defect, may update one or more defect management tools based on the retrained classification model, may provide, to a client device, the predicted root cause corrective action recommendation for the new defect or the updated defect, and/or may update root cause corrective action recommendations based on the predicted root cause corrective action recommendation for the new defect or the updated defect.

In some implementations, the creation platform may receive the defect classifier training data and may prioritize data in the defect classifier training data, prior to training the classification model with the defect classifier training data, in order to reduce a time required to train the classification model. In some implementations, when processing the historical data set associated with the portion of the particular class, the creation platform may process the historical data set associated with the portion of the particular class, with a fishbone generator model, to generate the root cause corrective action recommendation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
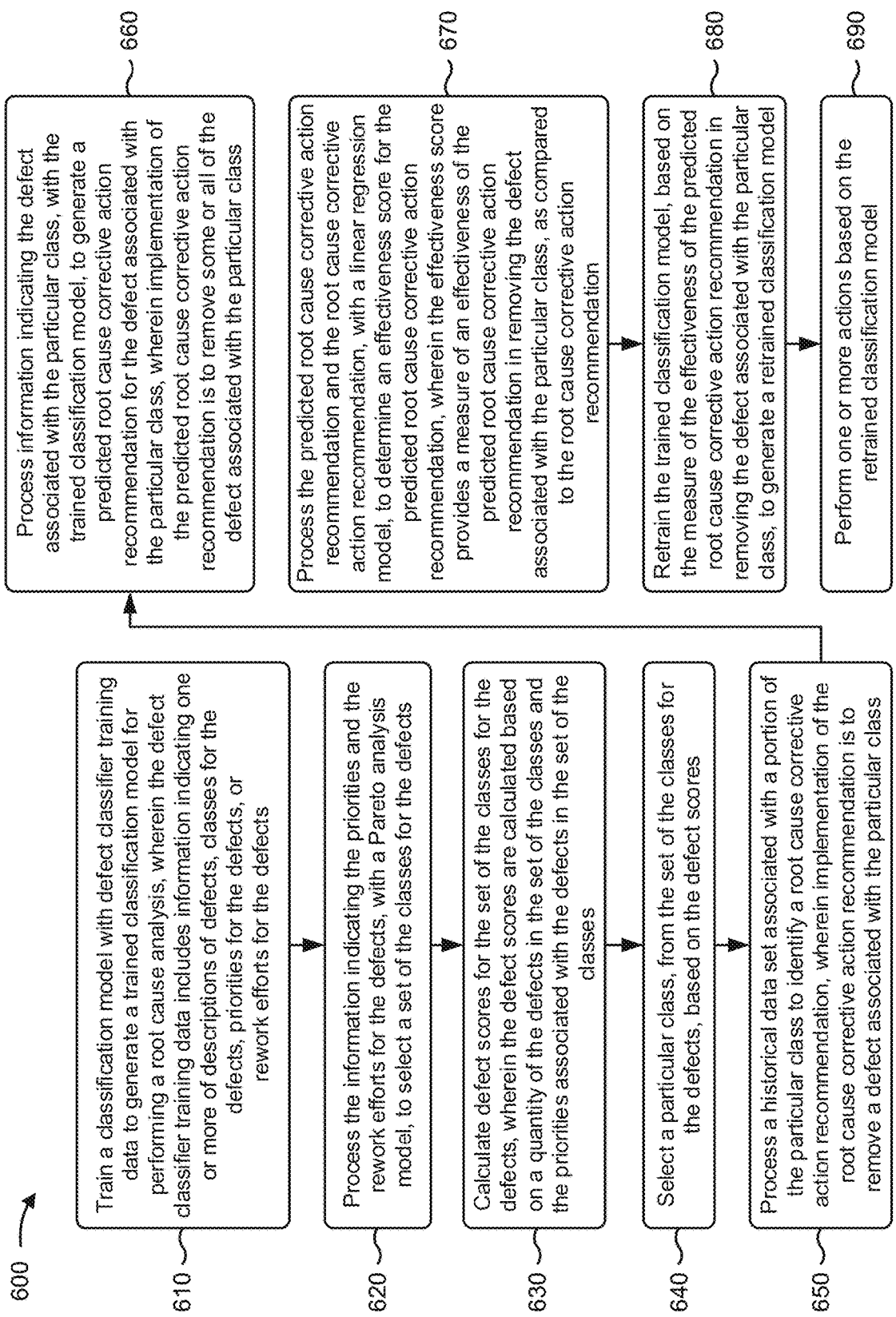

FIG. 6 is a flow chart of an example process 600 for utilizing artificial intelligence to generate and update a root cause analysis classification model. In some implementations, one or more process blocks of FIG. 6 may be performed by a creation platform (e.g., creation platform 220). In some implementations, one or more process blocks of FIG. 6 may be performed by another device or a group of devices separate from or including the creation platform, such as a client device (e.g., client device 210).

As shown in FIG. 6, process 600 may include training a classification model with defect classifier training data to generate a trained classification model for performing a root cause analysis, wherein the defect classifier training data includes information indicating one or more of descriptions of defects, classes for the defects, priorities for the defects, or rework efforts for the defects (block 610). For example, the creation platform (e.g., using computing resource 224, processor 320, memory 330, and/or the like) may train a classification model with defect classifier training data to generate a trained classification model for performing a root cause analysis, as described above in connection with FIGS. 1A-2. In some implementations, the defect classifier training data may include information indicating one or more of descriptions of defects, classes for the defects, priorities for the defects, or rework efforts for the defects.

As further shown in FIG. 6, process 600 may include processing the information indicating the priorities and the rework efforts for the defects, with a Pareto analysis model, to select a set of the classes for the defects (block 620). For example, the creation platform (e.g., using computing resource 224, processor 320, storage component 340, and/or the like) may process the information indicating the priorities and the rework efforts for the defects, with a Pareto analysis model, to select a set of the classes for the defects, as described above in connection with FIGS. 1A-2.

As further shown in FIG. 6, process 600 may include calculating defect scores for the set of the classes for the defects, wherein the defect scores are calculated based on a quantity of the defects in the set of the classes and the priorities associated with the defects in the set of the classes (block 630). For example, the creation platform (e.g., using computing resource 224, processor 320, memory 330, storage component 340, and/or the like) may calculate defect scores for the set of the classes for the defects, as described above in connection with FIGS. 1A-2. In some implementations, the defect scores may be calculated based on a quantity of the defects in the set of the classes and the priorities associated with the defects in the set of the classes.

As further shown in FIG. 6, process 600 may include selecting a particular class, from the set of the classes for the defects, based on the defect scores (block 640). For example, the creation platform (e.g., using computing resource 224, processor 320, memory 330, and/or the like) may select a particular class, from the set of the classes for the defects, based on the defect scores, as described above in connection with FIGS. 1A-2.

As further shown in FIG. 6, process 600 may include processing a historical data set associated with a portion of the particular class to identify a root cause corrective action recommendation, wherein implementation of the root cause corrective action recommendation is to remove a defect associated with the particular class (block 650). For example, the creation platform (e.g., using computing resource 224, processor 320, storage component 340, and/or the like) may process a historical data set associated with a portion of the particular class to identify a root cause corrective action recommendation, as described above in connection with FIGS. 1A-2. In some implementations, implementation of the root cause corrective action recommendation may be to remove a defect associated with the particular class.

As further shown in FIG. 6, process 600 may include processing information indicating the defect associated with the particular class, with the trained classification model, to generate a predicted root cause corrective action recommendation for the defect associated with the particular class, wherein implementation of the predicted root cause corrective action recommendation is to remove some or all of the defect associated with the particular class (block 660). For example, the creation platform (e.g., using computing resource 224, processor 320, memory 330, and/or the like) may process information indicating the defect associated with the particular class, with the trained classification model, to generate a predicted root cause corrective action recommendation for the defect associated with the particular class, as described above in connection with FIGS. 1A-2. In some implementations, implementation of the predicted root cause corrective action recommendation may remove some or all of the defect associated with the particular class.

As further shown in FIG. 6, process 600 may include processing the predicted root cause corrective action recommendation and the root cause corrective action recommendation, with a linear regression model, to determine an effectiveness score for the predicted root cause corrective action recommendation, wherein the effectiveness score provides a measure of an effectiveness of the predicted root cause corrective action recommendation in removing the defect associated with the particular class, as compared to the root cause corrective action recommendation (block 670). For example, the creation platform (e.g., using computing resource 224, processor 320, storage component 340, and/or the like) may process the predicted root cause corrective action recommendation and the root cause corrective action recommendation, with a linear regression model, to determine an effectiveness score for the predicted root cause corrective action recommendation, as described above in connection with FIGS. 1A-2. In some implementations, the effectiveness score may provide a measure of an effectiveness of the predicted root cause corrective action recommendation in removing the defect associated with the particular class, as compared to the root cause corrective action recommendation.

As further shown in FIG. 6, process 600 may include retraining the trained classification model, based on the measure of the effectiveness of the predicted root cause corrective action recommendation in removing the defect associated with the particular class, to generate a retrained classification model (block 680). For example, the creation platform (e.g., using computing resource 224, processor 320, memory 330, and/or the like) may retrain the trained classification model, based on the measure of the effectiveness of the predicted root cause corrective action recommendation in removing the defect associated with the particular class, to generate a retrained classification model, as described above in connection with FIGS. 1A-2.

As further shown in FIG. 6, process 600 may include performing one or more actions based on the retrained classification model (block 690). For example, the creation platform (e.g., using computing resource 224, processor 320, memory 330, communication interface 370, and/or the like) may perform one or more actions based on the retrained classification model, as described above in connection with FIGS. 1A-2.

Process 600 may include additional implementations, such as any single implementation or any combination of implementations described below and/or described with regard to any other process described herein.

In some implementations, the creation platform may cause the retrained classification model to be integrated with a defect management tool; may receive, from the defect management tool, information indicating a new defect; may process the new defect, with the retrained classification model, to generate a particular root cause corrective action recommendation; and may provide the particular root cause corrective action recommendation to the defect management tool.

In some implementations, the effectiveness score may be based on a quantity of defects encountered before implementation of the predicted root cause corrective action recommendation, a quantity of defects encountered after implementation of the predicted root cause corrective action recommendation, information indicating a rework effort required before implementation of the predicted root cause corrective action recommendation, and/or information indicating a rework effort required after implementation of the predicted root cause corrective action recommendation.

In some implementations, when performing the one or more actions, the creation platform may determine, with the retrained classification model, a predicted root cause corrective action recommendation for a new defect or an updated defect, may determine an effectiveness score for the predicted root cause corrective action recommendation for the new defect or the updated defect, may retrain the retrained classification model based on the effectiveness score for the predicted root cause corrective action recommendation for the new defect or the updated defect, may update one or more defect management tools based on the retrained classification model, may provide, to a client device, the predicted root cause corrective action recommendation for the new defect or the updated defect, and/or may update root cause corrective action recommendations based on the predicted root cause corrective action recommendation for the new defect or the updated defect.

In some implementations, the creation platform may process the defect classifier training data, with the trained classification model, to identify the information indicating the classes for the defects, may process the defect classifier training data, with a count vector, a cosine scorer, and the linear regression model, to identify the information indicating the priorities for the defects, and may process the defect classifier training data, with the count vector and the linear regression model, to identify the information indicating the rework efforts for the defects.

In some implementations, when processing the historical data set associated with the portion of the particular class, the creation platform may process the historical data set associated with the portion of the particular class, with a fishbone generator model, to generate the root cause corrective action recommendation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    training, by a device, a classification model with defect classifier training data to generate a trained classification model for performing a root cause analysis;
    utilizing, by the device, the trained classification model to determine information indicating classes, priorities, and rework efforts for defects indicated in the defect classifier training data,
        wherein utilizing the trained classification model includes processing the defect classifier training data with a count vector and a linear regression model to determine information indicating the rework efforts for the defects;
    processing, by the device, the information indicating the priorities and the rework efforts for the defects, with a Pareto analysis model, to select a set of the classes for the defects;
    calculating, by the device, defect scores for the set of the classes for the defects,
        wherein the defect scores are calculated based on a quantity of the defects in the set of the classes and the priorities associated with the defects in the set of the classes;
    selecting, by the device, a particular class, from the set of the classes for the defects, based on the defect scores;
    processing, by the device, a historical data set associated with a portion of the particular class to identify a root cause corrective action recommendation, wherein implementation of the root cause corrective action recommendation is to remove a defect associated with the particular class;
processing, by the device, information indicating the defect associated with the particular class, with the trained classification model, to generate a predicted root cause corrective action recommendation for the defect associated with the particular class,
wherein implementation of the predicted root cause corrective action recommendation is to remove some or all of the defect associated with the particular class;
determining, by the device, an effectiveness score for the predicted root cause corrective action recommendation based on the root cause corrective action recommendation,
wherein the effectiveness score provides a measure of an effectiveness of the predicted root cause corrective action recommendation in removing the defect associated with the particular class, as compared to the root cause corrective action recommendation;
retraining, by the device, the trained classification model, based on the measure of the effectiveness of the predicted root cause corrective action recommendation in removing the defect associated with the particular class, to generate a retrained classification model; and
performing, by the device, one or more actions based on the retrained classification model.

2. The method of claim 1, further comprising:
causing the retrained classification model to be integrated with one or more defect management tools.

3. The method of claim 1, further comprising:
receiving, from a client device, information indicating a new defect or an updated defect;
processing the new defect or the updated defect, with the retrained classification model, to generate a particular root cause corrective action recommendation; and
providing the particular root cause corrective action recommendation to the client device.

4. The method of claim 1, wherein performing the one or more actions comprises one or more of:
determining, with the retrained classification model, a predicted root cause corrective action recommendation for a new defect or an updated defect;
determining an effectiveness score for the predicted root cause corrective action recommendation for the new defect or the updated defect;
retraining the retrained classification model based on the effectiveness score for the predicted root cause corrective action recommendation for the new defect or the updated defect;
updating one or more defect management tools based on the retrained classification model;
providing, to a client device, the predicted root cause corrective action recommendation for the new defect or the updated defect; or
updating root cause corrective action recommendations based on the predicted root cause corrective action recommendation for the new defect or the updated defect.

5. The method of claim 1, wherein the classification model includes a deep neural network (DNN) multi-label classification model.

6. The method of claim 1, wherein utilizing the trained classification model to generate the classes, the priorities, and the rework efforts comprises:
processing the defect classifier training data, with the trained classification model, to determine information indicating the classes for the defects; and
processing the defect classifier training data, with the count vector, a cosine scorer, and the linear regression model, to determine information indicating the priorities for the defects.

7. The method of claim 1, wherein processing the historical data set associated with the portion of the particular class comprises:
processing the historical data set associated with the portion of the particular class, with a fishbone generator model, to generate the root cause corrective action recommendation.

8. A device, comprising:
one or more memories; and
one or more processors, communicatively coupled to the one or more memories, to:
train a classification model with defect classifier training data to generate a trained classification model for performing a root cause analysis;
process the defect classifier training data, with the trained classification model, to identify information indicating classes for defects indicated in the defect classifier training data;
process the defect classifier training data, with a count vector, a cosine scorer, and a linear regression model, to identify information indicating priorities for the defects;
process the defect classifier training data, with the count vector and the linear regression model, to identify information indicating rework efforts for the defects;
process the information indicating the priorities and the rework efforts for the defects, with a Pareto analysis model, to select a set of the classes for the defects;
calculate defect scores for the set of the classes for the defects,
wherein the defect scores are calculated based on a quantity of the defects in the set of the classes and the priorities associated with the defects in the set of the classes;
select a particular class, from the set of the classes for the defects, based on the defect scores;
process a historical data set associated with a portion of the particular class to identify a root cause corrective action recommendation,
wherein implementation of the root cause corrective action recommendation is to remove a defect associated with the particular class;
process information indicating the defect associated with the particular class, with the trained classification model, to generate a predicted root cause corrective action recommendation for the defect associated with the particular class,
wherein implementation of the predicted root cause corrective action recommendation is to remove some or all of the defect associated with the particular class;
determine an effectiveness score for the predicted root cause corrective action recommendation based on the root cause corrective action recommendation,
wherein the effectiveness score provides a measure of an effectiveness of the predicted root cause corrective action recommendation in removing the defect associated with the particular class, as compared to the root cause corrective action recommendation;

retrain the trained classification model, based on the measure of the effectiveness of the predicted root cause corrective action recommendation in removing the defect associated with the particular class, to generate a retrained classification model; and perform one or more actions based on the retrained classification model.

9. The device of claim 8, wherein, when determining the effectiveness score, the one or more processors are to:

process the predicted root cause corrective action recommendation and the root cause corrective action recommendation, with the linear regression model, to determine the effectiveness score.

10. The device of claim 8, wherein the effectiveness score is based on one or more of:

a quantity of defects encountered before implementation of the predicted root cause corrective action recommendation, a quantity of defects encountered after implementation of the predicted root cause corrective action recommendation, information indicating a rework effort required before implementation of the predicted root cause corrective action recommendation, or information indicating a rework effort required after implementation of the predicted root cause corrective action recommendation.

11. The device of claim 8, wherein the one or more processors are further to:

receive, from a client device, information indicating a new defect or an updated defect;

process the new defect or the updated defect, with the retrained classification model, to generate a particular root cause corrective action recommendation; and provide the particular root cause corrective action recommendation to the client device.

12. The device of claim 8, wherein, when performing the one or more actions, the one or more processors are to one or more of:

determine, with the retrained classification model, a predicted root cause corrective action recommendation for a new defect or an updated defect;

determine an effectiveness score for the predicted root cause corrective action recommendation for the new defect or the updated defect;

retrain the retrained classification model based on the effectiveness score for the predicted root cause corrective action recommendation for the new defect or the updated defect;

update one or more defect management tools based on the retrained classification model;

provide, to a client device, the predicted root cause corrective action recommendation for the new defect or the updated defect; or update root cause corrective action recommendations based on the predicted root cause corrective action recommendation for the new defect or the updated defect.

13. The device of claim 8, wherein the one or more processors are further to:

receive the defect classifier training data; and prioritize data in the defect classifier training data prior to training the classification model with the defect classifier training data in order to reduce a time it takes to train the classification model.

14. The device of claim 8, wherein, when processing the historical data set associated with the portion of the particular class, the one or more processors are to:

process the historical data set associated with the portion of the particular class, with a fishbone generator model, to generate the root cause corrective action recommendation.

15. A non-transitory computer-readable medium storing instructions, the instructions comprising:

one or more instructions that, when executed by one or more processors of a device, cause the one or more processors to:

train a classification model with defect classifier training data to generate a trained classification model for performing a root cause analysis, wherein the defect classifier training data includes information indicating one or more of:
descriptions of defects,
classes for the defects,
priorities for the defects, or
rework efforts for the defects;

process the defect classifier training data, with a count vector and a linear regression model, to identify the information indicating the rework efforts for the defects;

process the information indicating the priorities and the rework efforts for the defects, with a Pareto analysis model, to select a set of the classes for the defects;

calculate defect scores for the set of the classes for the defects, wherein the defect scores are calculated based on a quantity of the defects in the set of the classes and the priorities associated with the defects in the set of the classes;

select a particular class, from the set of the classes for the defects, based on the defect scores;

process a historical data set associated with a portion of the particular class to identify a root cause corrective action recommendation, wherein implementation of the root cause corrective action recommendation is to remove a defect associated with the particular class;

process information indicating the defect associated with the particular class, with the trained classification model, to generate a predicted root cause corrective action recommendation for the defect associated with the particular class, wherein implementation of the predicted root cause corrective action recommendation is to remove some or all of the defect associated with the particular class;

process the predicted root cause corrective action recommendation and the root cause corrective action recommendation, with the linear regression model, to determine an effectiveness score for the predicted root cause corrective action recommendation, wherein the effectiveness score provides a measure of an effectiveness of the predicted root cause corrective action recommendation in removing the defect associated with the particular class, as compared to the root cause corrective action recommendation;

retrain the trained classification model, based on the measure of the effectiveness of the predicted root cause corrective action recommendation in removing the defect associated with the particular class, to generate a retrained classification model; and perform one or more actions based on the retrained classification model.

16. The non-transitory computer-readable medium of claim 15, wherein the instructions further comprise:

one or more instructions that, when executed by the one or more processors, cause the one or more processors to:

cause the retrained classification model to be integrated with a defect management tool;

receive, from the defect management tool, information indicating a new defect;

process the new defect, with the retrained classification model, to generate a particular root cause corrective action recommendation; and provide the particular root cause corrective action recommendation to the defect management tool.

17. The non-transitory computer-readable medium of claim 15, wherein the effectiveness score is based on one or more of:

a quantity of defects encountered before implementation of the predicted root cause corrective action recommendation, a quantity of defects encountered after implementation of the predicted root cause corrective action recommendation, information indicating a rework effort required before implementation of the predicted root cause corrective action recommendation, or information indicating a rework effort required after implementation of the predicted root cause corrective action recommendation.

18. The non-transitory computer-readable medium of claim 15, wherein the one or more instructions, that cause the one or more processors to perform the one or more actions, cause the one or more processors to one or more of:

determine, with the retrained classification model, a predicted root cause corrective action recommendation for a new defect or an updated defect;

determine an effectiveness score for the predicted root cause corrective action recommendation for the new defect or the updated defect;

retrain the retrained classification model based on the effectiveness score for the predicted root cause corrective action recommendation for the new defect or the updated defect;

update one or more defect management tools based on the retrained classification model;

provide, to a client device, the predicted root cause corrective action recommendation for the new defect or the updated defect; or update root cause corrective action recommendations based on the predicted root cause corrective action recommendation for the new defect or the updated defect.

19. The non-transitory computer-readable medium of claim 15, wherein the instructions further comprise:

one or more instructions that, when executed by the one or more processors, cause the one or more processors to:

process the defect classifier training data, with the trained classification model, to identify the information indicating the classes for the defects; and process the defect classifier training data, with the count vector, a cosine scorer, and the linear regression model, to identify the information indicating the priorities for the defects.

20. The non-transitory computer-readable medium of claim 15, wherein the one or more instructions, that cause the one or more processors to process the historical data set associated with the portion of the particular class, cause the one or more processors to:

process the historical data set associated with the portion of the particular class, with a fishbone generator model, to generate the root cause corrective action recommendation.

* * * * *